(12) United States Patent
Kondo et al.

(10) Patent No.: US 11,751,714 B2
(45) Date of Patent: Sep. 12, 2023

(54) ELECTRICAL DEVICE FOR MAKING BEVERAGES USING POWER TOOL BATTERY

(71) Applicant: MAKITA CORPORATION, Anjo (JP)

(72) Inventors: Tomoyuki Kondo, Anjo (JP);
Katsuhito Fujinami, Anjo (JP)

(73) Assignee: MAKITA CORPORATION, Anjo (JP)

( * ) Notice: Subject to any disclaimer, the term of this patent is extended or adjusted under 35 U.S.C. 154(b) by 79 days.

(21) Appl. No.: 17/154,573

(22) Filed: Jan. 21, 2021

(65) Prior Publication Data

US 2021/0169262 A1 Jun. 10, 2021

Related U.S. Application Data

(63) Continuation of application No. 15/997,848, filed on Jun. 5, 2018, now Pat. No. 10,925,428.

(30) Foreign Application Priority Data

Jul. 19, 2017 (JP) .................................. 2017-139946
Nov. 29, 2017 (JP) .................................. 2017-228767

(51) Int. Cl.
*A47J 31/00* (2006.01)
*H01M 50/247* (2021.01)
(Continued)

(52) U.S. Cl.
CPC ............. *A47J 31/005* (2013.01); *A23F 5/262* (2013.01); *A47J 31/505* (2013.01); *H01M 10/42* (2013.01); *H01M 50/247* (2021.01); *H02K 7/145* (2013.01)

(58) Field of Classification Search
CPC ... F02P 15/02; F02P 15/08; F02P 3/02; H01T 13/08; H01T 13/16; H01T 13/18;
(Continued)

(56) References Cited

U.S. PATENT DOCUMENTS 3,290,484 A 12/1966 Day
3,998,143 A 12/1976 Frye
(Continued)

FOREIGN PATENT DOCUMENTS

CN 1097909 1/1995 ............... H04B 1/08
CN 1097909 A 1/1995
(Continued)

OTHER PUBLICATIONS

Office Action and Search Report from the Chinese Patent Office dated Feb. 2, 2021 in related Chinese application Mo. 201810442812, and translation thereof.

(Continued)

*Primary Examiner* — Nathaniel E Wiehe
*Assistant Examiner* — Ket D Dang
(74) *Attorney, Agent, or Firm* — J-TEK LAW PLLC; Jeffrey D. Tekanic; Scott T. Wakeman

(57) ABSTRACT

An electrical device includes a battery-mount part (40) configured such that a battery used as a power supply of a power tool is mountable thereon, and a heat-generating element (54) for boiling water using electric power from the battery (B1, B2) mounted on the battery-mount part. The electrical device further includes a drip case (21) for holding a pod, in which a predetermined amount of tea leaves or coffee grounds is encased in a permeable bag-shaped element. A hot water supply (50y) supplies the water boiled by the heat-generating element (54) automatically to the drip case (21). An extraction part (21p) in the drip case (21) allows a beverage produced by the hot water that has been poured onto (injected into) the pod to downwardly flow.

20 Claims, 26 Drawing Sheets

(51) Int. Cl.
*A23F 5/26* (2006.01)
*A47J 31/50* (2006.01)
*H01M 10/42* (2006.01)
*H02K 7/14* (2006.01)

(58) Field of Classification Search
CPC ....... H01T 13/22; H01T 13/24; H01T 13/462;
H01T 21/02; H01T 13/20; H01T 13/32;
H01T 13/34; H01T 13/46; A23F 5/262;
A47J 31/005; A47J 31/505; B29C 65/342;
B29C 66/1222; B29C 66/1224; B29C
66/131; B29C 66/301; B29C 66/322;
B29C 66/3242; B29C 66/534; B29C
66/54; B29C 66/547; B29C 66/5472;
B29C 66/55; B29C 66/8322; B29L
2031/7492; H01M 10/42; H01M 50/20;
H01M 50/247; H02K 7/145; Y02E 60/10
USPC .......................................................... 99/280
See application file for complete search history.

(56) References Cited

U.S. PATENT DOCUMENTS

| | | | |
|---|---|---|---|
| 5,111,740 A | 5/1992 | Klein | |
| 5,471,667 A | 11/1995 | Yamada | |
| 5,669,287 A | 9/1997 | Jefferson et al. | |
| 5,725,304 A | 3/1998 | Inai | |
| 5,923,257 A | 7/1999 | Nolte | |
| 5,980,965 A | 11/1999 | Jefferson et al. | |
| 6,049,144 A | 4/2000 | Frannhagen et al. | |
| 6,123,010 A | 9/2000 | Blackstone | |
| 8,180,204 B2 * | 5/2012 | Glucksman ......... | A47J 31/4407 392/328 |
| 9,559,539 B2 | 1/2017 | Goto et al. | |
| 2002/0130137 A1 | 9/2002 | Greenwald et al. | |
| 2003/0006638 A1 | 1/2003 | Tyler | |
| 2005/0077878 A1 | 4/2005 | Carrier et al. | |
| 2005/0093508 A1 | 5/2005 | Taniguchi et al. | |
| 2005/0229795 A1 | 10/2005 | Stuckey | |
| 2006/0188249 A1 | 8/2006 | Noguchi | |
| 2007/0193451 A1 | 8/2007 | Brown et al. | |
| 2007/0278202 A1 | 12/2007 | Long et al. | |
| 2008/0041231 A1 | 2/2008 | Beharry et al. | |
| 2008/0148956 A1 | 6/2008 | Maurer | |
| 2009/0084270 A1 | 4/2009 | Pinheiro | |
| 2009/0108806 A1 | 4/2009 | Takano et al. | |
| 2010/0192314 A1 | 8/2010 | Otsuka et al. | |
| 2011/0197389 A1 * | 8/2011 | Ota ...................... | H01M 50/20 429/121 |
| 2013/0036914 A1 | 2/2013 | Icardi | |
| 2013/0164589 A1 | 6/2013 | Ota et al. | |
| 2013/0187461 A1 | 7/2013 | Goto et al. | |
| 2015/0272372 A1 * | 10/2015 | Allemand ........... | A47J 37/1261 99/403 |
| 2015/0333301 A1 | 11/2015 | Ota et al. | |
| 2017/0098949 A1 | 4/2017 | Goto et al. | |
| 2017/0125754 A1 | 5/2017 | Ota et al. | |
| 2018/0081261 A1 | 3/2018 | Wu et al. | |
| 2020/0127251 A1 | 4/2020 | Ota et al. | |

FOREIGN PATENT DOCUMENTS

| | | | |
|---|---|---|---|
| CN | 2843285 | 12/2006 | |
| CN | 101006898 A | 8/2007 | |
| CN | 102599972 | 7/2012 | ............ A61B 18/08 |
| CN | 102599972 A | 7/2012 | |
| CN | 103153140 | 6/2013 | ............ A47J 27/21 |
| CN | 103153140 A * | 6/2013 | ............ A47J 31/005 |
| CN | 103153140 A | 6/2013 | |
| CN | 204654646 | 9/2015 | ............ A47J 31/44 |
| CN | 204654646 U | 9/2015 | |
| CN | 204694984 | 10/2015 | ............ G03B 21/54 |
| CN | 204694984 U | 10/2015 | |
| CN | 204909085 | 12/2015 | ............ A47J 31/00 |
| CN | 204909085 U | 12/2015 | |
| CN | 205979866 | 2/2017 | ............... F23Q 2/34 |
| CN | 205979866 U | 2/2017 | |
| CN | 206044384 | 3/2017 | ............ A47J 31/44 |
| CN | 206044384 U | 3/2017 | |
| CN | 206239165 | 6/2017 | ............ A47J 31/58 |
| CN | 206239165 U | 6/2017 | |
| CN | 206283289 | 6/2017 | ................ H02J 7/00 |
| CN | 206283289 U | 6/2017 | |
| GB | 405614 A | 1/1934 | |
| JP | S49151155 U | 12/1974 | |
| JP | S63147146 U | 9/1988 | |
| JP | H0526278 | 7/1993 | |
| JP | H09155769 A | 6/1997 | |
| JP | H1099199 A | 4/1998 | |
| JP | 2000308268 A | 11/2000 | |
| JP | 2004297957 A | 10/2004 | |
| JP | 2010178773 A | 8/2010 | |
| JP | 2011161602 A | 8/2011 | |
| JP | 2012115945 | 6/2012 | ............ B23D 47/00 |
| JP | 2012115945 A | 6/2012 | |
| JP | 2014050578 A | 3/2014 | |
| JP | 5657332 B2 | 1/2015 | |
| WO | 0072736 A1 | 12/2000 | |

OTHER PUBLICATIONS

Office Action from the Japanese Patent Office dated Jul. 13, 2021 in related Japanese application No. 2017-228767, and translation thereof.

Office Action from the Japanese Patent Office dated Dec. 27, 2022, in counterpart Japanese application No. 2021-171484, and machine translation thereof.

* cited by examiner

ELECTRICAL DEVICE FOR MAKING BEVERAGES USING POWER TOOL BATTERY

CROSS-REFERENCE

The present application is a continuation of U.S. patent application Ser. No. 15/997,848 filed on Jun. 5, 2018, now U.S. Pat. No. 10,925,428, which claims priority to Japanese patent application serial number 2017-139946 filed on Jul. 19, 2017 and to Japanese patent application serial number 2017-228767 filed on Nov. 29, 2017, the contents of both of which are incorporated fully herein by reference.

TECHNICAL FIELD

The present invention generally relates to an electrical device, such as a hot beverage making device, comprising a battery-mount part configured such that a battery used in a power supply of a power tool is mountable thereon, and a heat-generating means, which can boil water by using electric power (current) supplied by the battery mounted on the battery-mount part.

BACKGROUND ART

A coffeemaker 100 described in U.S. Pat. No. 9,559,539 (JP Patent No. 5657332 B2) is shown herein in FIG. 26. This coffee maker 100 includes a first battery-mount part 103a and a second battery-mount part 103b located inside a battery-storage compartment 102. Furthermore, an 18-V battery B1, which is designed for use as a power supply of a power tool, is mountable on the first battery-mount part 103a, and, likewise, a 14.4 V power tool battery B2 is (simultaneously) mountable on the second battery-mount part 103b. In this coffeemaker 100, it is possible, for example, to supply electric power to a heat-generating means (heating element) of the coffeemaker 100 using the 18-V battery B1 or the 14.4 V battery B2. Moreover, such a coffeemaker 100 makes it possible to brew coffee, e.g., at a construction work site (or any other location where a commercial AC power supply is not available) using the batteries B1, B2 of a power tool.

SUMMARY OF THE INVENTION

The above-described known coffeemaker 100 is configured such that a filter is housed inside a filter case 105, hot water is discharged into the filter case 105 after a proper quantity of coffee grounds has been placed in the filter case 105, and then coffee is dripped down into a decanter 106. Consequently, at a work site, it is necessary to scoop coffee grounds, using a measuring spoon or the like (which must also be brought to the work site), from a bag of coffee grounds and put the scooped coffee grounds in the filter, thereby making it inconvenient to brew coffee at the work site. In addition, the above-described known coffeemaker 100 is capable of simultaneously mounting two different batteries B1, B2, which necessitates complicated electronics to prevent electrical problems.

It is one, non-limiting object of the present teachings to, e.g., make it easy to brew a hot beverage at a construction work site by operating an electrical device using a battery of a power tool.

In a first aspect of the present teachings, an electrical device (e.g., a hot beverage maker) comprises a battery-mount part, which is configured such that a battery (battery pack, battery cartridge) designed for use as a power supply of a power tool is mountable thereon, and a heat-generating means (heating element), which can boil water by using electric power supplied by the battery mounted on the battery-mount part. The electrical device further comprises: a case configured to hold a pod or other type of single-serve container, which contains a predetermined amount of, e.g., tea leaves or coffee grounds within a water-permeable bag-shaped element or a capsule, as well as a hot water supply configured such that water boiled by the heat-generating means can be supplied automatically to the case. An extraction part (e.g., a drain hole, which may optionally comprise a spring-loaded stopper) is provided on the case and permits the hot beverage produced by the hot water that had been poured onto (injected into) the pod or other single-serve container to flow out of the case, e.g., into a decanter (carafe, coffee pot).

According to this first aspect of the present teachings, the electrical device can be operated, e.g., at a construction work site or other location where an AC power source is not available, using a battery (battery pack, battery cartridge) designed for use with a power tool, such as a driver drill, circular saw, etc. Furthermore, because a pod or other single-serve container (e.g., a pre-packaged coffee or tea container) can be used, it becomes unnecessary to, for example, use a measuring spoon or the like to take coffee grounds out of a coffee grounds bag and place them in a filter, such that a hot beverage can be easily and conveniently made, e.g., at a construction work site.

According to a second aspect of the present teachings, the electrical device further comprises: a water reservoir that holds water, and a passageway configured such that the water can be supplied from the water reservoir to the location of the heat-generating means. Preferably, the heat-generating means is disposed at a location lower than the water reservoir. Thus, if the heat-generating means is disposed at a location lower than the water reservoir, a water-supplying means, such as a pump, is unnecessary for supplying water from the water reservoir to the heat-generating means.

According to a third aspect of the present teachings, the battery-mount part is provided at a location lower than that of the water reservoir. In such an embodiment, when water is being boiled, the battery, which is heavy, is disposed at a low location, which gives the electrical device a low center of gravity and thereby improves the stability of the electrical device.

According to a fourth aspect of the present teachings, a wall preferably partitions a space, in which a container (e.g., a tank) comprising the water reservoir is housed, from a space in which the heat-generating means is housed. In such an embodiment, water can be prevented from entering the space in which electrical components such as the heat-generating means are housed.

According to a fifth aspect of the present teachings, a wall preferably partitions a space, in which a hot water supply nozzle of the hot water supply that supplies the hot water to the case is housed, from the space in which the heat-generating means is housed. In such an embodiment as well, hot water can be prevented from entering the space in which the heat-generating means is housed.

A sixth aspect of the present teachings concerns the fact that, in the above-described known coffeemaker 100 shown in FIG. 26, it is possible to simultaneously mount an 18-V battery B1 and a 14.4-V battery B2 on a first battery-mount part 103a and a second battery-mount part 103b of a battery-storage part 102. Consequently, the electrical circuit of the coffeemaker 100 requires a voltage-switching circuit. In addition, an interlock circuit or the like is necessary to ensure that the voltage of the 18-V electrical circuit is not applied to the 14.4-V electrical circuit. Consequently, the circuit configuration of the coffeemaker 100 is relatively complex. In addition, there is also a possibility that problems will occur in the interlock circuit or the like over the course of time.

Therefore, according to the sixth aspect of the present teachings, it is preferable to simplify the circuit configuration by making a voltage-selecting circuit, an electrical interlock, etc. unnecessary, and to improve electrical reliability. In an embodiment of the sixth aspect, the electrical device comprises: a plurality of the battery-mount parts that are preferably configured such that, when one battery is mounted on one of the battery-mount parts, it is not possible (e.g., it is impossible) to mount another battery on the other battery-mount part. In such an embodiment, even though a plurality of battery-mount parts is provided, only one battery can be mounted on the battery-mount parts at a time. That is, a plurality of batteries is never mounted on the battery-mount parts simultaneously. Consequently, a battery-switching circuit, an interlock circuit, etc. become unnecessary, the circuit configuration is simplified, and electrical reliability is improved.

According to a seventh aspect of the present teachings, the sizes of the battery-mount parts of the plurality of battery-mount parts differ, and a configuration is employed such that the batteries (battery packs, battery cartridges) having sizes corresponding to the battery-mount parts are mountable on the corresponding battery-mount parts.

According to an eighth aspect of the present teachings, a pair of guide rails and a plurality of terminals are provided on each of the battery-mount parts. Furthermore, each of the plurality of battery-mount parts differs from each other in the arrangement of the guide rails and/or in the arrangement of the plurality of terminals. Therefore, the electrical device is configured such that different types of batteries, which are respectively capable of engaging with and sliding with respect to the pair of guide rails and are capable of electrically connecting to the terminals of each of the different battery-mount parts, are mountable on the respective (different) battery-mount parts.

According to a ninth aspect of the present teachings, a cover member is designed such that it exposes one of the battery-mount parts and covers the other battery-mount part. Furthermore, the cover member is slidable relative to the plurality of battery-mount parts. Consequently, when one of the batteries is mounted on the sole exposed battery-mount part, the other battery-mount part is covered by the cover member. That is, when one of the batteries is mounted on one of the battery-mount parts, because the positive and negative terminals (charging part) of the other battery-mount part are not exposed (i.e. the terminals are covered by the cover member), a short-circuit fault can be prevented.

According to a tenth aspect of the present teachings, the plurality of battery-mount parts is provided in a side-by-side arrangement, and the cover member is configured such that it is capable of sliding in the side-by-side direction of the plurality of battery-mount parts. Therefore, by sliding the cover member, one of the battery-mount parts is exposed and the other battery-mount part is covered.

According to an eleventh aspect of the present teachings, the electrical device is configured such that, when one battery is mounted on one of the battery-mount parts, if another battery is moved in the mounting direction with respect to the other battery-mount part, then the other battery makes contact with the battery mounted on the one battery-mount part, thereby blocking the movement of the other battery. That is, the plurality of battery-mount parts are disposed or arranged closely together, so that there is insufficient space to simultaneously mount two or more batteries on the battery-mount parts. Consequently, even in the hypothetical situation in which the cover member has been removed, it is still impossible to simultaneously mount two or more of the batteries on the plurality of the battery-mount parts.

According to a twelfth aspect of the present teachings, the plurality of battery-mount parts is provided on one (i.e. the same) side surface of a housing, and a lid configured to cover or close an opening of the water reservoir is provided on an upper surface of the housing. The lid is preferably located on an upper side of the one side surface of the housing on which the battery-mount parts are provided, and is configured to stand up like a wall along an end edge of the upper surface of the housing when the lid is positioned (raised) to open the opening of the water reservoir. In such an embodiment, when water is being supplied (poured) into the water reservoir within the housing, the lid, which stands up like a wall, blocks water from splashing onto the battery-mount parts.

According to a thirteenth aspect of the present teachings, the lid is coupled by a hinge mechanism to the housing such that the lid can pivot about the end edge of the upper surface of the housing.

According to a fourteenth aspect of the present teachings, the electrical device preferably comprises a cover-operation switch, which operates in conjunction with movement of the cover member. Preferably, the cover-operation switch is configured to disconnect a power-supply line between a power-supply terminal of the battery-mount part covered by the cover member and the heat-generating means, and to connect a power-supply line between a power-supply terminal of the exposed one battery-mount part and the heat-generating means. Consequently, for example, when a battery is mounted on the sole exposed battery-mount part, no voltage is applied to the positive and negative terminals (charging part) of the battery-mount part covered by the cover member.

According to a fifteenth aspect of the present teachings, the cover-operation switch is configured such that, if the cover member is removed from the battery-mount parts, the power-supply line between the power-supply terminals of all the battery-mount parts and the heat-generating means is disconnected. Consequently, the electrical device can no longer be used after the cover member has been removed, thereby improving device safety.

According to a sixteenth aspect of the present teachings, the electrical device preferably comprises: a water reservoir (e.g., a tank) that holds water; and a passageway configured to supply the water from the water reservoir to the location of the heat-generating means. Preferably, the battery-mount part(s) is (are) provided at a location higher than the water reservoir. In such an embodiment, when water is being supplied (poured) into the water reservoir, the likelihood that some of the water will splash onto the mounted battery is reduced.

According to a seventeenth aspect of the present teachings, the electrical device according to any one of preceding aspects, or any of the subsequently-described embodiments, further includes one or more batteries that are mountable on the battery-mount part(s) of the electrical device.

It is noted that not all elements are required to be utilized in all embodiments, and e.g., some aspects may be omitted to develop additional embodiments of the present teachings.

For example, in aspects of the present teachings relating to the electrical circuits, arrangement of the battery-mount parts, the lid, the other components of the electrical device, etc., it is not necessary to use a pod or other single-serving container containing, e.g., coffee or tea. That is, in such embodiments, loose coffee grounds or loose tea leaves may be placed in a filter provided in the case.

Additional aspects, objects, embodiments and advantages of the present teachings will become apparent to a person of ordinary skill upon reading the following description of presently preferred embodiments and the appended claims in view of the drawings.

DETAILED DESCRIPTION OF EMBODIMENTS

Figure 1:
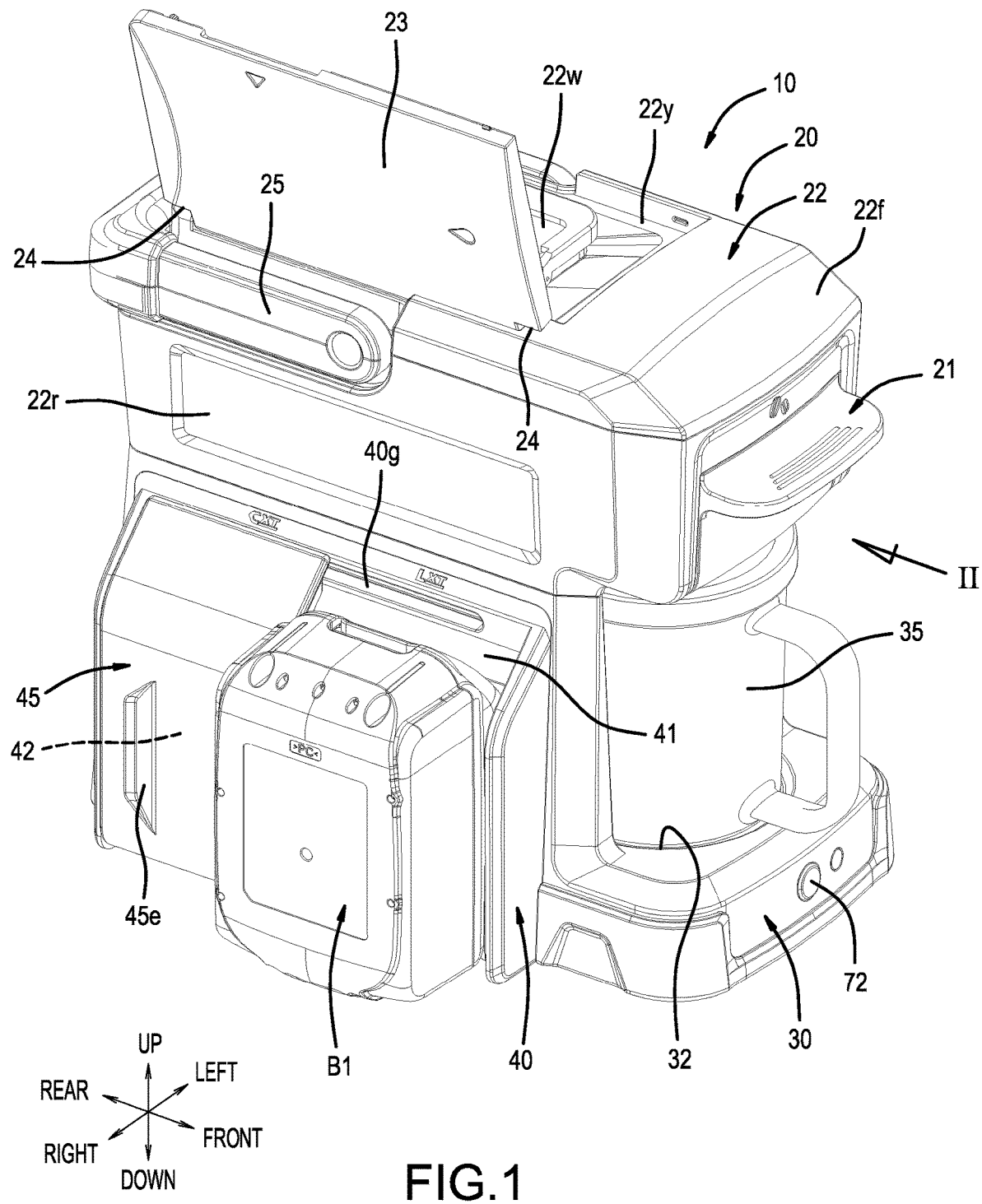
FIG. 1 is an oblique view (a battery B1 mounting diagram), viewed from the front left, of a coffeemaker, which is an electrical device according to a first embodiment of the present teachings.

An electrical device according to representative, non-limiting embodiments of the present teachings will be explained below with reference to FIG. 1 to FIG. 25. As shown in FIG. 1, etc., the representative electrical device according to the first embodiment of the present teachings is a coffeemaker 10 in which a battery of a power tool is used as a power supply. Here, front, rear, left, right, up, and down shown in the drawings correspond to front, rear, left, right, up, and down of the coffeemaker 10. As will be apparent, the coffeemaker 10 is also capable of making other brewed (hot) beverages, such as tea, hot chocolate, etc.

Overview of Configuration of Coffeemaker 10

As shown in FIG. 1, etc., the coffeemaker 10 comprises: a coffeemaker-main-body 20 that brews the hot beverage (e.g., drips coffee); a decanter (carafe, coffeepot) 35 that collects the dripped hot beverage (e.g., coffee); a plate 30 on which the decanter 35 is placed; and a battery-mount part 40 on which two batteries B1, B2 are alternately mountable. The coffeemaker-main-body 20 comprises a substantially box-shaped housing 22 that is elongated in the front-rear direction and is formed such that an upper part and a lower part of the housing 22 project forward from a center part of the housing 22. A recessed portion 22r is provided, e.g., for adhering a label. Furthermore, a drip-case-holder 22f, which houses a drip case 21, is provided at the location of a forward-projection part of the upper part of the housing 22. A housing space for the decanter 35 is provided downward of the drip-case-holder 22f. Furthermore, the plate 30, which is the forward-projection part of the lower part of the housing 22, is provided on a lower side of the housing space for the decanter 35.

Figure 4:
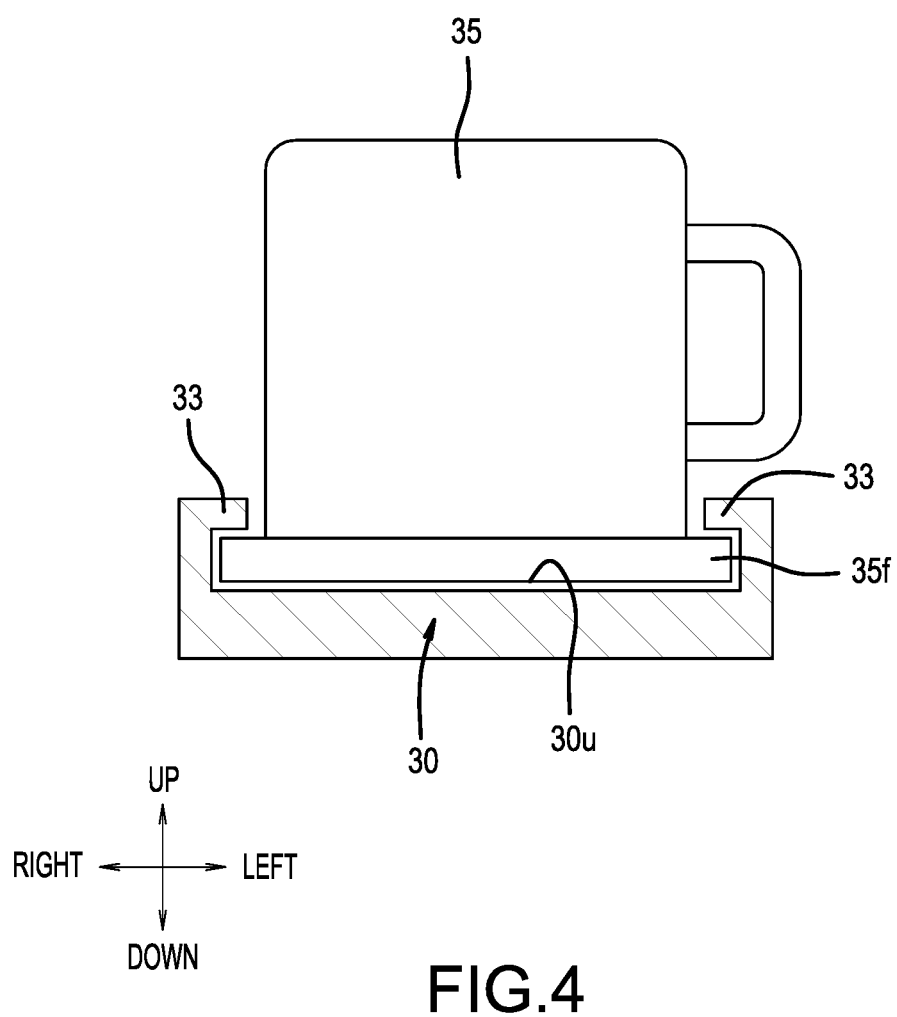
FIG. 4 is a front view that shows a support structure of the coffee decanter (a modified example).

In this embodiment, as shown in FIG. 1, the decanter 35 is placed on the plate 30 such that it is fitted into a bottom of a center recessed part 32 formed on an upper surface of the plate 30. As shown in FIG. 4, retaining rails 33, which extend in the front-rear direction, are provided on the left and right sides of the plate 30, and these retaining rails 33 can confine flanges 35f, which are formed on (extend from) the bottom of the decanter 35, in the left-right direction and the up-down direction. Therefore, the decanter 35 can be placed on the plate 30 by being slid from the front to the rear such that the flanges 35f of the decanter 35 are confined by an upper surface 30u of the plate 30 and the left and right retaining rails 33. As a result, it is less likely that the decanter 35 will fall off the plate 30 while the coffeemaker 10 is being transported.

Figure 5:
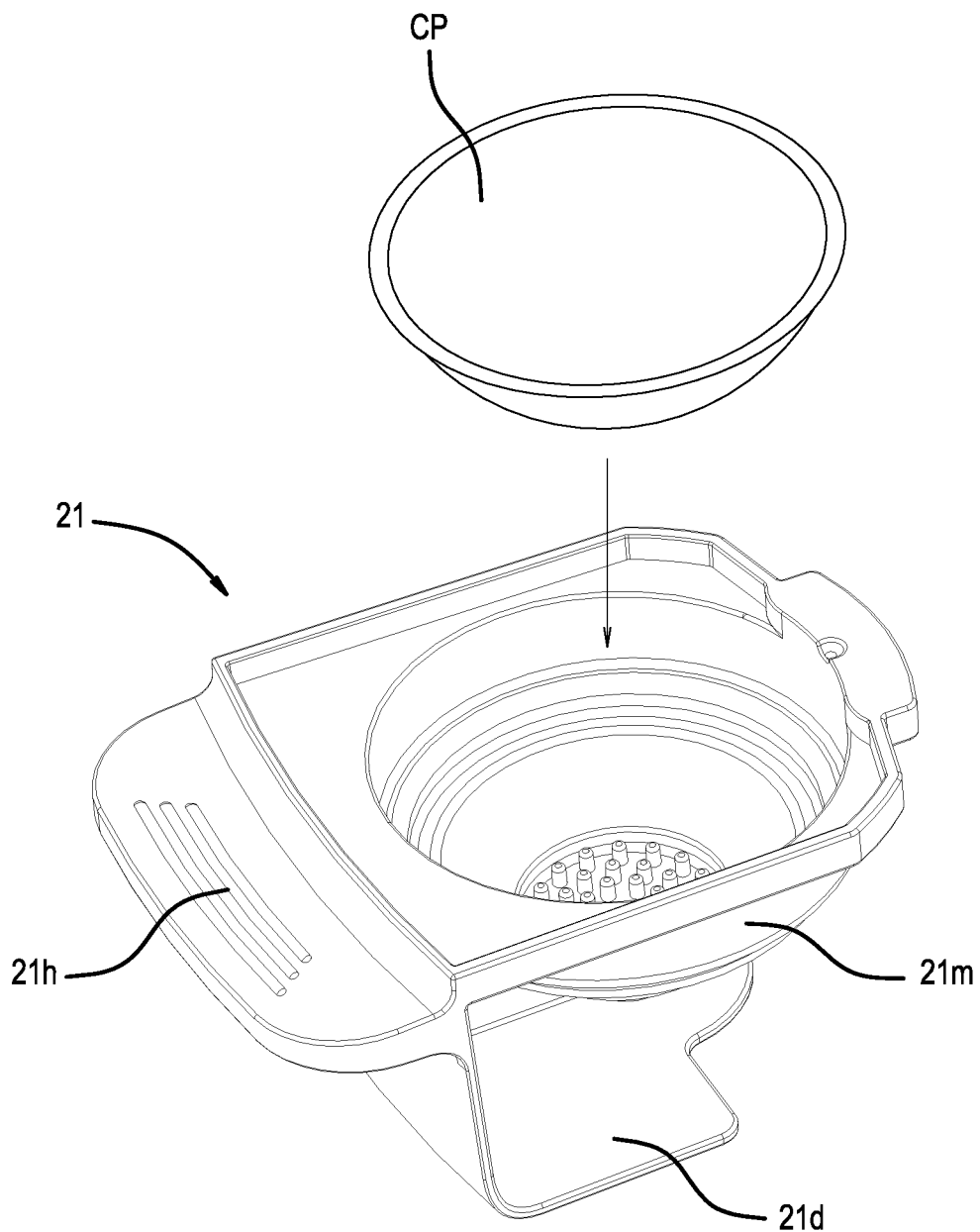
FIG. 5 is an oblique view of a drip case (for use with coffee pods) of the coffeemaker.
Figure 6:
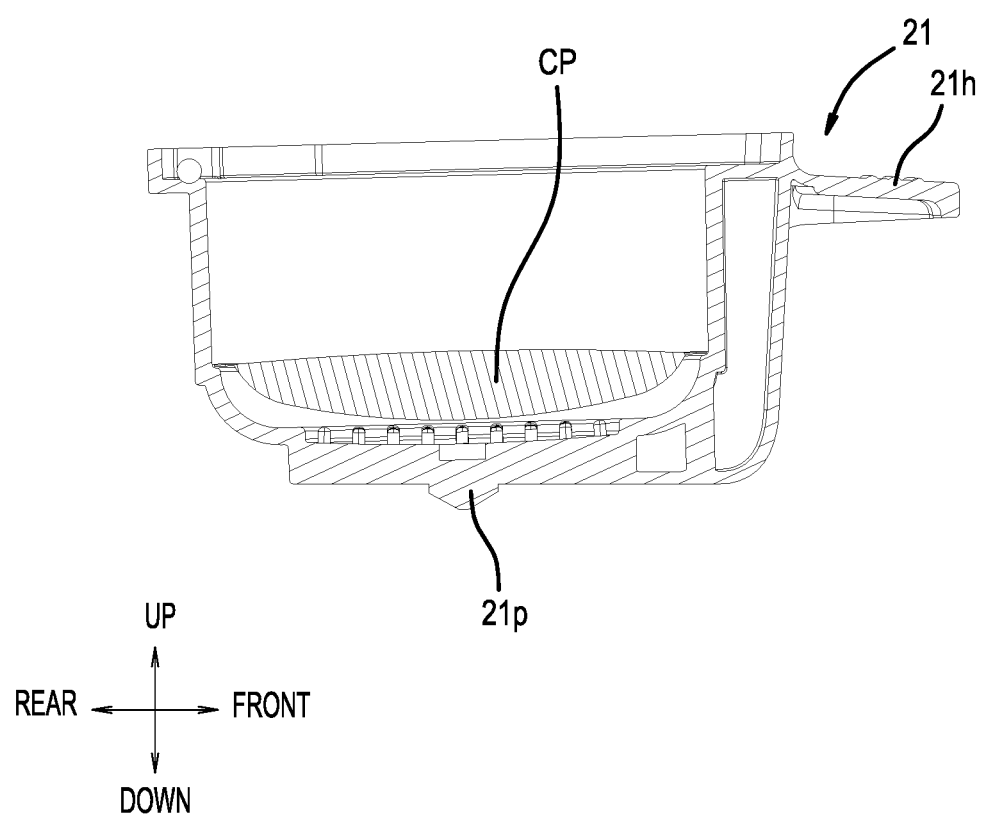
FIG. 6 is a longitudinal cross-sectional view of the drip case (for use with coffee pods).

The drip case 21 is configured such that it can be inserted, from the front, into the drip-case-holder 22f of the housing 22. The drip case 21 is also known in the art as a brewing funnel, brewing basket, pod holder, capsule holder, drip tray, etc. As shown in FIGS. 5 and 6, the drip case 21 comprises: a case-main-body 21m; a handle 21h, which projects forward from a front-surface upper part of the case-main-body 21m; and a holder 21d, which is substantially L-shaped in a side view and supports the case-main-body 21m from below. Furthermore, an extraction part 21p, which permits the brewed coffee, tea, etc. to flow downwardly into the decanter 35, is provided at the center of the bottom of the case-main-body 21m. The extraction part 21p may be merely a drain hole, or may be a drain hole having a spring-loaded stopper that is configured to open the drain hole only when the decanter 35 is placed underneath the drip case 21. As shown in FIG. 5 and FIG. 6, the drip case 21 is configured such that a coffee pod CP, e.g., a bag-shaped filter prefilled with an appropriate quantity of coffee grounds, e.g., for a single serving or for multiple servings, can be set in the case-main-body 21m. That is, the coffee pod CP corresponds to a pod, a single-serving container or a pre-filled coffee or tea pack that is capable of preparing one, two or more servings and also is formed as a filter material that encases a predetermined amount of coffee grounds, tea leaves, etc., of the present teachings. The case-main-body 21m corresponds to a case (brewing funnel, brewing basket, pod holder, capsule holder, drip tray, etc.) of the present teachings. It is noted that the filter is typically formed of a nonwoven fabric, paper, or the like, but the filter can also be formed of other materials.

Figure 7:
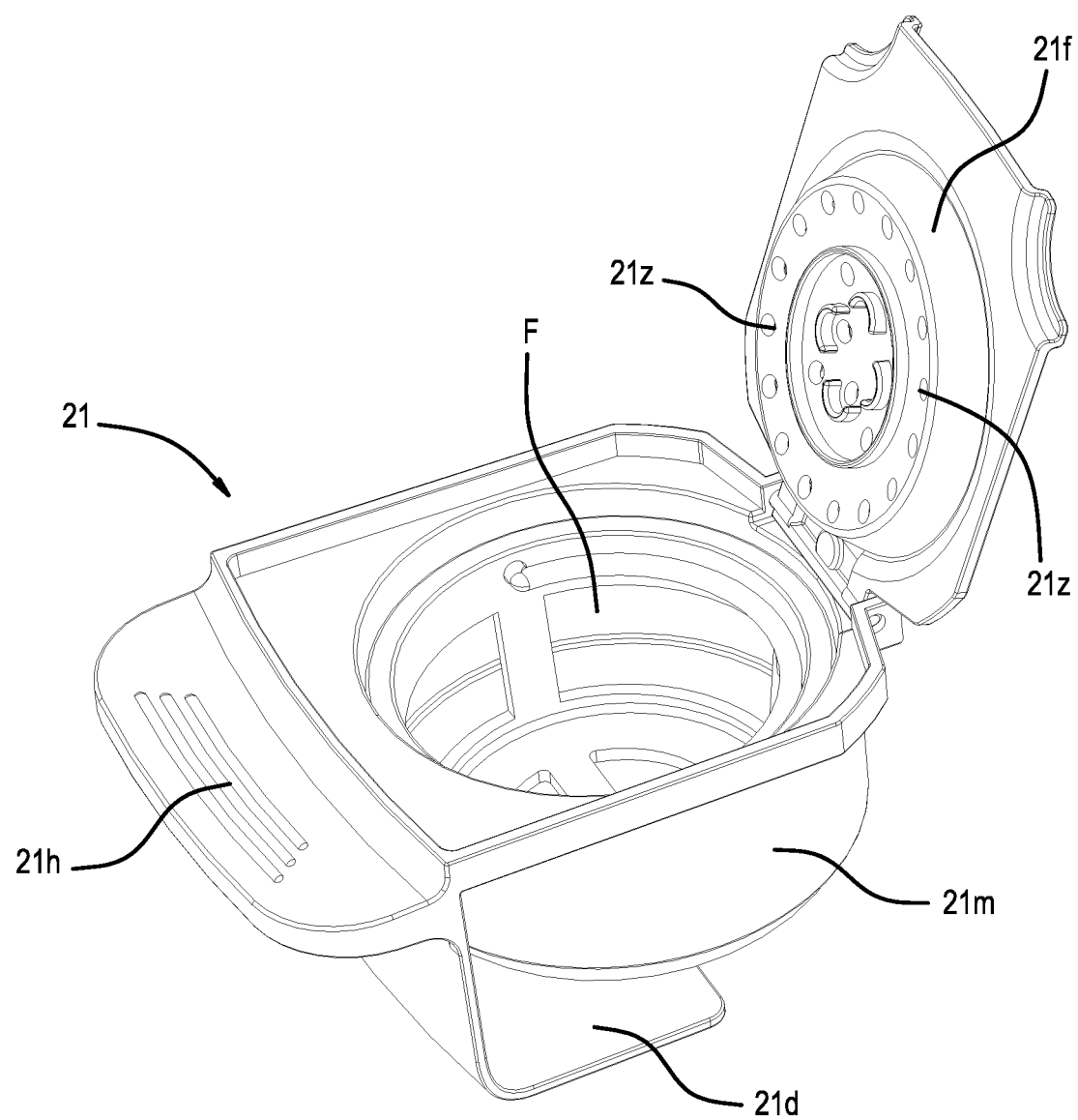
FIG. 7 is an oblique view of the drip case (for use with a filter).
Figure 8:
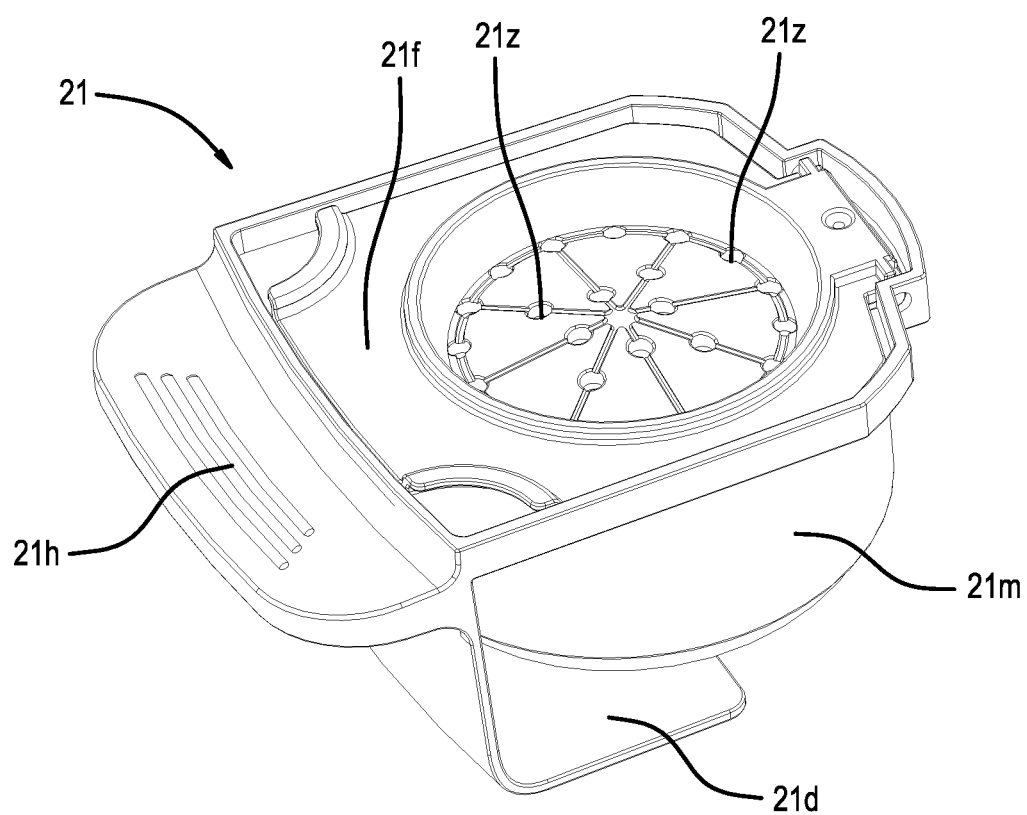
FIG. 8 is an oblique view of the drip case (for use with a filter).

Instead of configuring the drip case 21 exclusively for use with a coffee pod CP, it is also possible to configure the drip case 21 for use with a mesh filter F, as shown in FIG. 7 and FIG. 8. In this configuration of the drip case 21, the user can place an appropriate quantity of loose coffee grounds, loose tea leaves, etc. in the mesh filter F. The drip case 21 of this embodiment may further comprise a lid 21f having numerous holes 21z, through which hot water can pass, formed therein.

Figure 2:
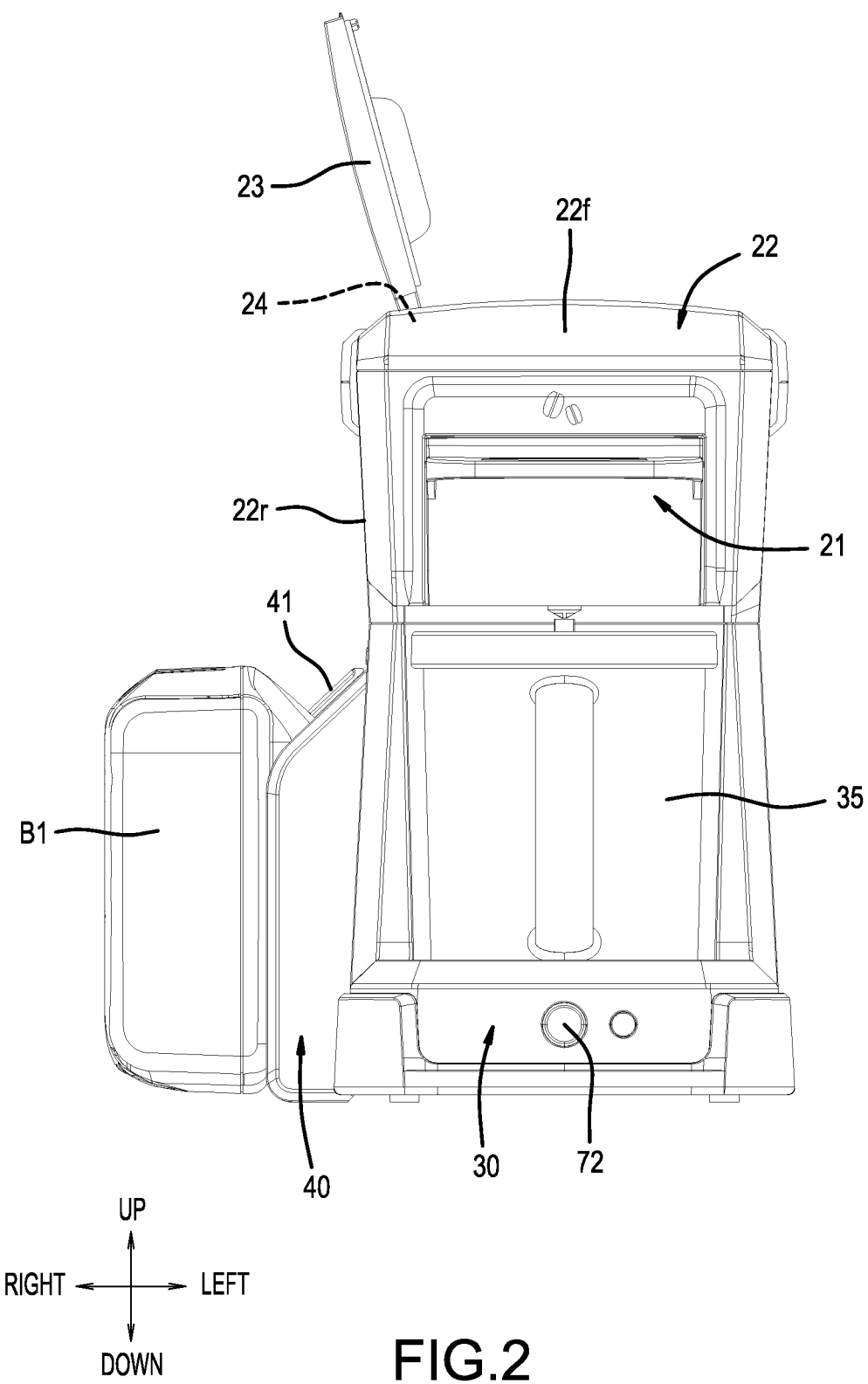
FIG. 2 is a front view (an auxiliary view taken in the direction of arrow II in FIG. 1) of the coffeemaker.
Figure 3:
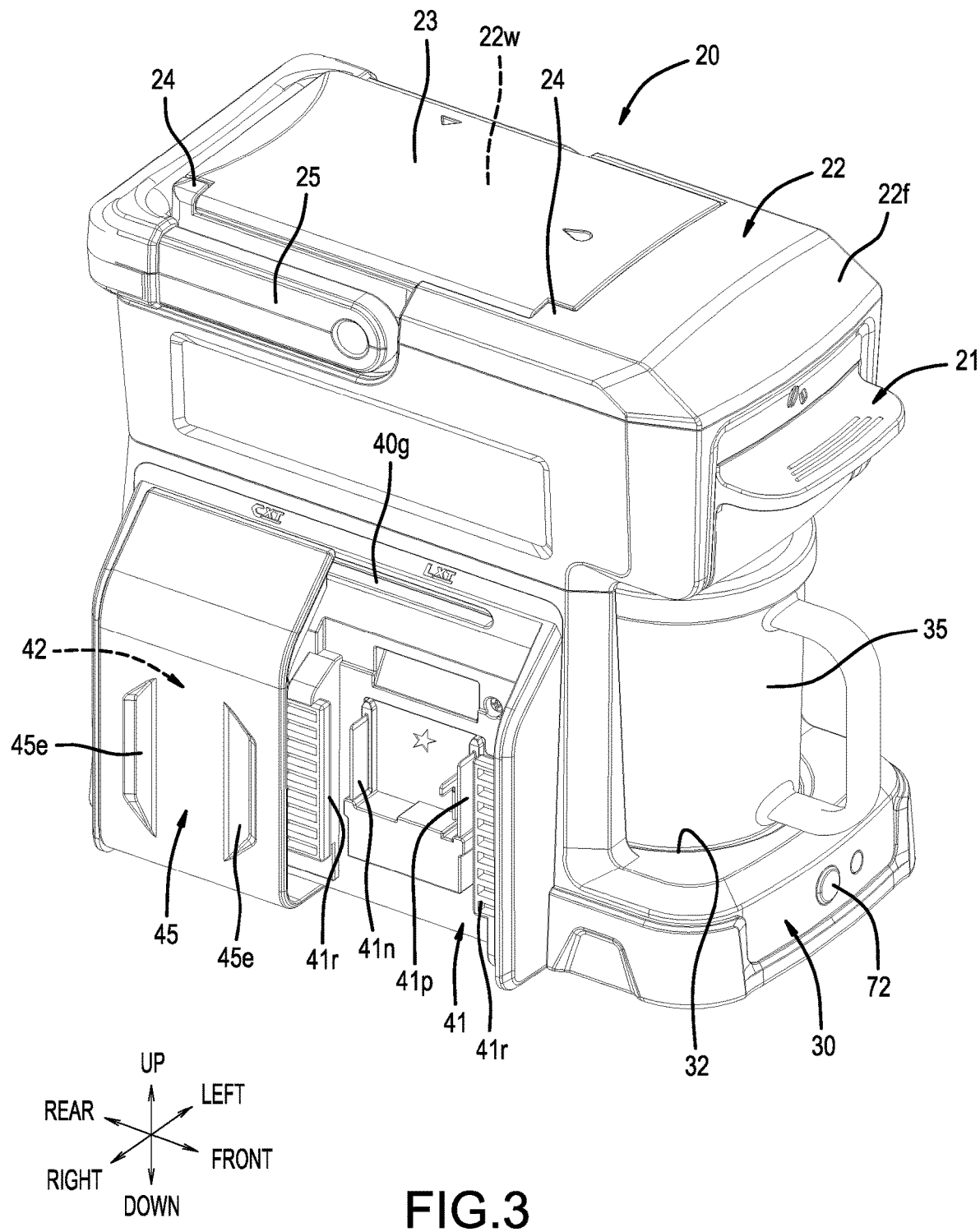
FIG. 3 is an oblique view (a view in which the battery B1 has been removed), viewed from the front right, of the coffeemaker.
Figure 13:
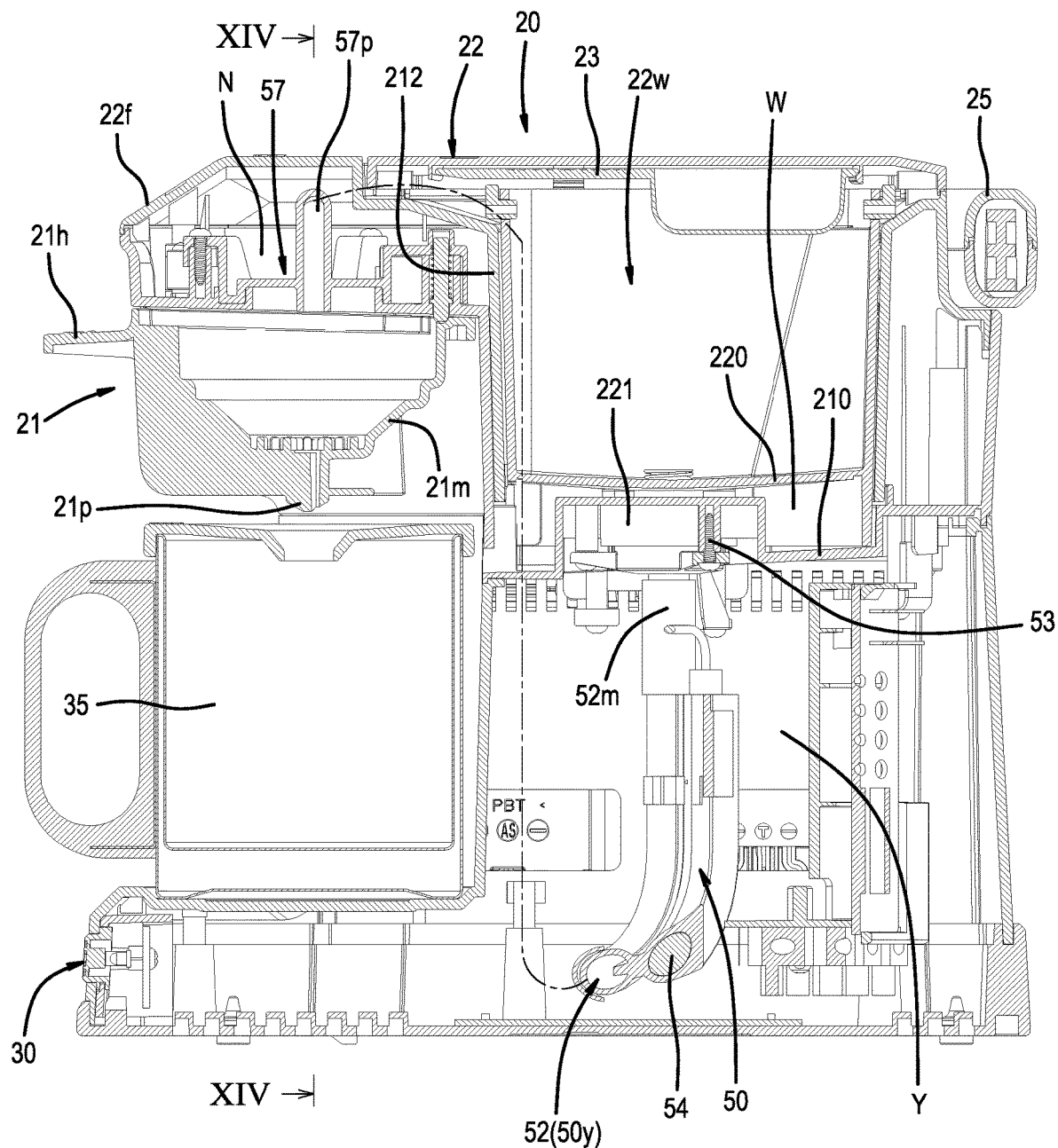
FIG. 13 is a longitudinal cross-sectional view (1) that shows the water-heating element, etc., of the coffeemaker.

As shown in FIGS. 1 and 13, a water reservoir (reservoir tank) 22w, which holds water at a location on a rear side of the drip-case-holder 22f, is provided in the upper part of the housing 22 at substantially the same height position as that of the drip case 21. The water reservoir 22w has an opening in the upper surface of the housing 22 and is configured such that the opening can be opened and closed by a lid 23, which has an oblong shape. The upper surface of the housing 22 is formed into an oblong shape, and a lid-storage recessed part 22y (refer to FIG. 1), which likewise has an oblong shape, is formed on an inner side of the edge of that upper surface. Furthermore, as shown in FIG. 3, when the lid 23 closes the opening of the water reservoir 22w, the lid 23 is housed in the lid-storage recessed part 22y, and thus the upper surface of the lid 23 is flush with the upper surface of the housing 22. As shown in FIG. 1, a right-side part of the lid 23 is coupled to the right side (edge) of the lid-storage recessed part 22y of the housing 22 by one or more hinge mechanisms 24. Therefore, by pivoting (counterclockwise pivoting in FIG. 2) the lid 23 upward about the hinge mechanism(s) 24, the upper opening of the water reservoir 22w is exposed (opened) so that water can be poured in. Further, as shown in FIG. 2, when the lid 23 has been pivoted to its counter-clockwise-pivot limit position, the lid 23 is held in the state of being slightly tilted in the rightward direction and stands up like a wall.

As shown in FIG. 1, etc., the housing 22 comprises a gate-type handle 25, which is coupled to the housing 22 such that left and right legs of the gate-type handle 25 can pivot up and down about a center part in the front-rear direction of the upper part of the housing 22. That is, by raising the gate-type handle 25, the coffeemaker 10 can be transported while holding the gate-type handle 25. In addition, by lowering the gate-type handle 25 rearward down to the horizontal position, the gate-type handle 25 can be stored around the lid-storage recessed part 22y of the housing 22, as shown in FIG. 1, etc. Furthermore, the battery-mount part 40 (described below), which is configured such that multiple types (2 types in the drawings) of power-tool batteries can be mounted, are provided in a vertical orientation on the right-side surface of the housing 22. In addition, a water-heating element 50 (described below), which heats/boils water supplied from the water reservoir 22w and guides the hot water to the location of the drip case 21, and an electrical circuit 60 (described below), which supplies electric power from the batteries B1, B2 of the battery-mount part 40 to a heater 54, etc., of the water-heating element 50, are housed inside the housing 22.

Battery-Mount Part 40

The battery-mount part 40 optionally comprises a first battery-mount part 41 and a second battery-mount part 42, which are provided side-by-side in the front-rear direction. A front-rear slide-type cover member 45 is slidable to cover either the first battery-mount part 41 or the second battery-mount part 42. As shown in FIG. 1, the first battery-mount part 41 is a structure on which, e.g., an 18-V battery or a 14.4-V battery (below, called a first battery B1) used by a power tool can be mounted.

Figure 16:
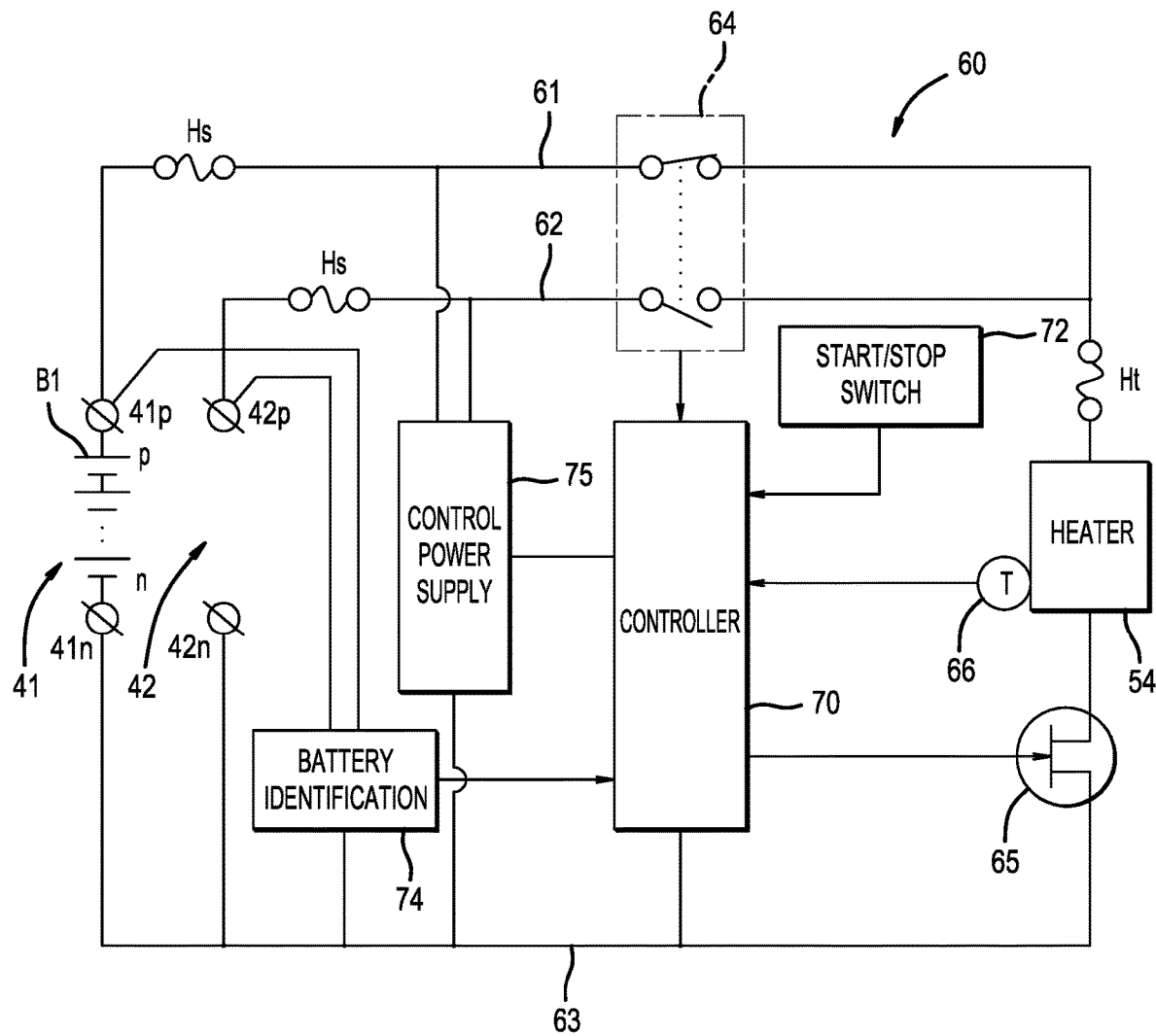
FIG. 16 is an electrical-circuit diagram of the coffeemaker (when the battery B1 is mounted).

As shown in FIG. 3, the first battery-mount part 41 comprises a pair of front and right guide rails 41r, which extend in the up-down direction. A positive terminal 41p and a negative terminal 41n are provided between the guide rails 41r. In addition, a pair of rail-receiving parts (not shown), which are capable of engaging with the pair of guide rails 41r of the first battery-mount part 41, is provided on the first battery B1. A positive terminal p and a negative terminal n are provided between the rail-receiving parts of the first battery B1. Therefore, by mating, from above, the pair of rail-receiving parts of the first battery B1 with the pair of guide rails 41r of the first battery-mount part 41 and sliding the first battery B1 downward, the first battery B1 can be mounted on the first battery-mount part 41. Furthermore, as shown in FIG. 16, when the first battery B1 is mounted on the first battery-mount part 41, the positive terminal p and the negative terminal n of the first battery B1 are respectively connected to the positive terminal 41p and the negative terminal 41n of the first battery-mount part 41. In this mounted state, it becomes possible to supply electric power from the first battery B1 to the heater(s) 54 of the water-heating element 50, etc., by using (via) the electrical circuit 60.

Figure 9:
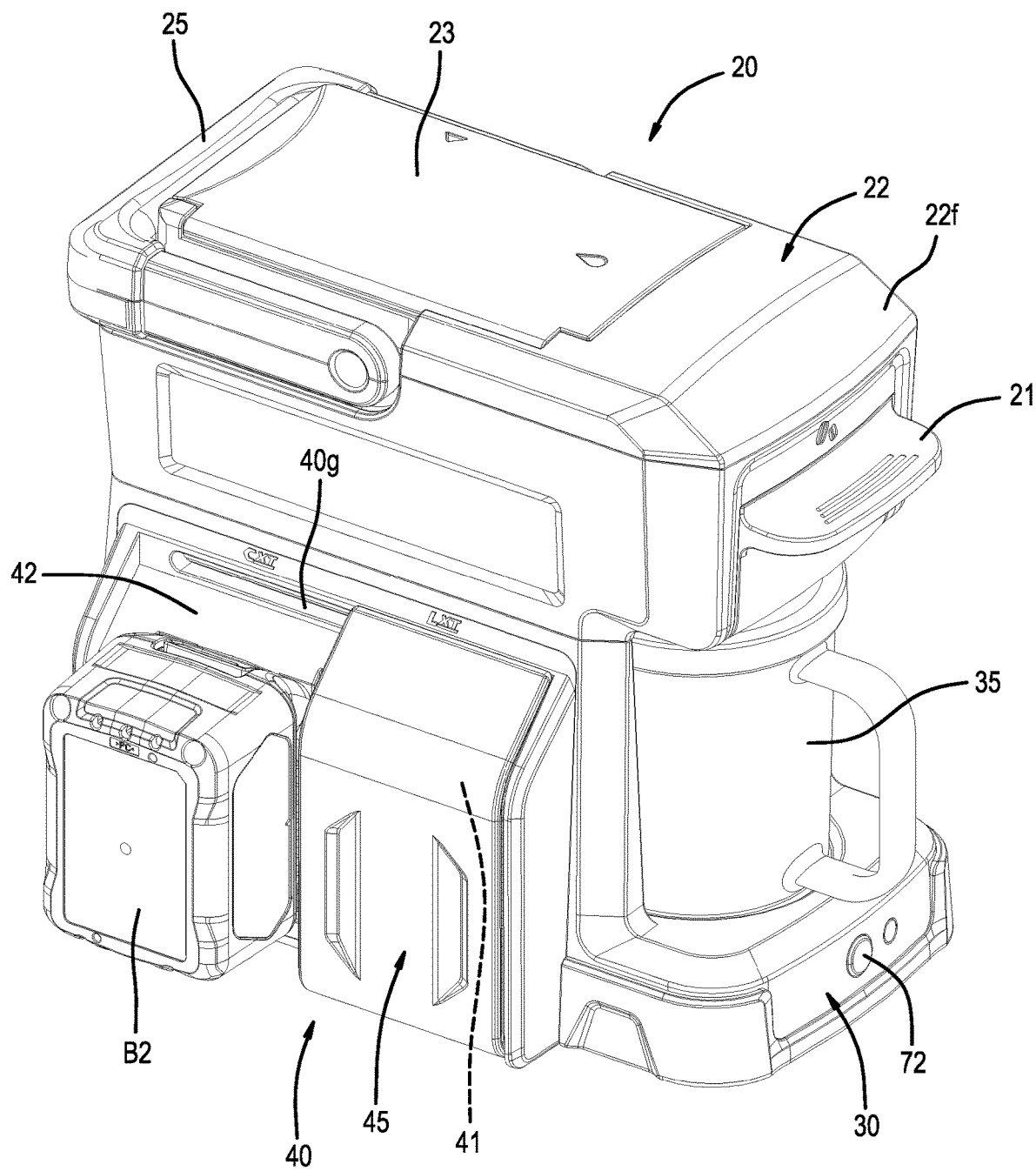
FIG. 9 is an oblique view (a battery B2 mounting diagram), viewed from the front right, of the coffeemaker.
Figure 10:
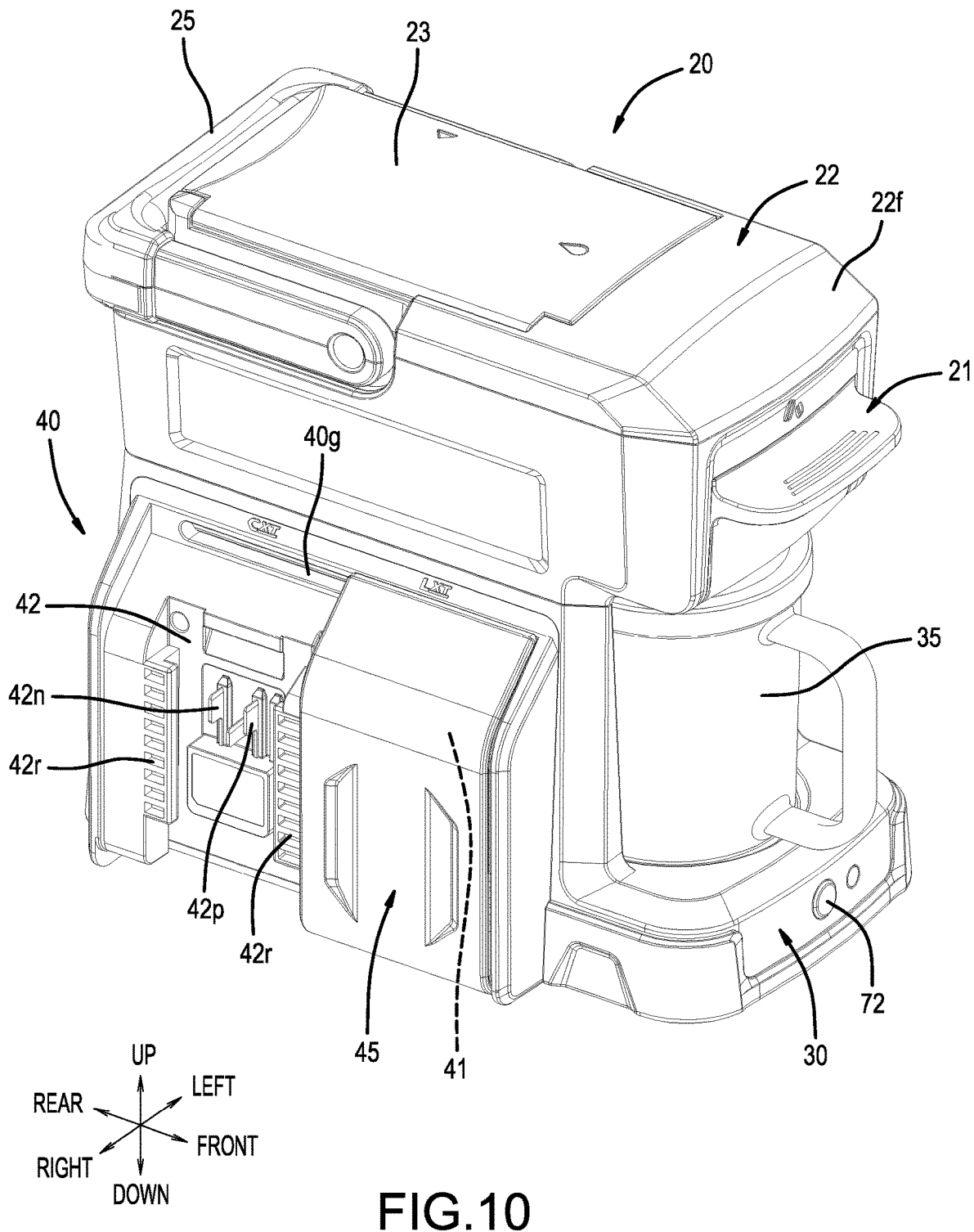
FIG. 10 is an oblique view (a view in which the battery B2 has been removed), viewed from the front right, of the coffeemaker.

As shown in FIG. 9, the second battery-mount part 42 is a structure on which, e.g., a 10.8-V battery (hereinbelow, called the second battery B2) used by a power tool can be mounted. As shown in FIG. 10, the second battery-mount part 42 comprises a pair of front and rear guide rails 42r extending in the up-down direction. A positive terminal 42p and a negative terminal 42n are provided between the pair of guide rails 42r. In addition, a pair of rail-receiving parts (not shown), which is capable of engaging with the pair of guide rails 42r of the second battery-mount part 42, is provided on the second battery B2. A positive terminal p and a negative terminal n are provided between the pair of rail-receiving parts of the second battery B2. Therefore, by engaging, from above, the pair of rail-receiving parts of the second battery B2 with the pair of guide rails 42r of the second battery-mount part 42 and sliding the second battery B2 downward, the second battery B2 can be mounted on the second battery-mount part 42.

Figure 17:
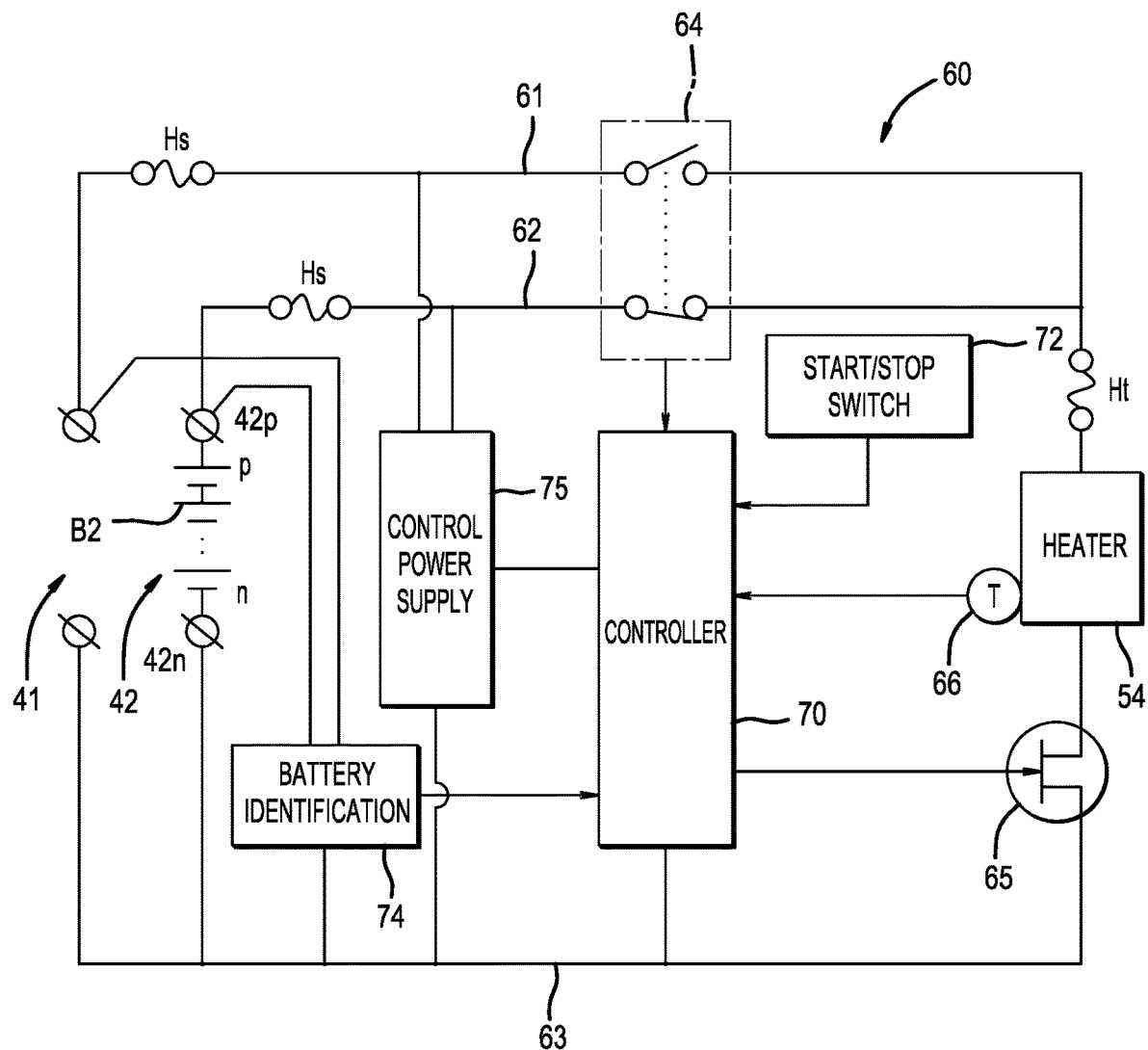
FIG. 17 is an electrical-circuit diagram of the coffeemaker (when the battery B2 is mounted).

Furthermore, as shown in FIG. 17, when the second battery B2 is mounted on the second battery-mount part 42, the positive terminal p and the negative terminal n of the second battery B2 are respectively connected to the positive terminal 42p and the negative terminal 42n of the second battery-mount part 42. In this mounted state, it becomes possible to supply electric power from the second battery B2 to the heater(s) 54 of the water-heating element 50, etc., by using (via) the electrical circuit 60. In this embodiment, the spacing between the guide rails 42r of the second battery-mount part 42 is set such that it is smaller than the gap between the guide rails 41r of the first battery-mount part 41. Consequently, it is not possible to mount the first battery B1 on the second battery-mount part 42, and it is also not possible to mount the second battery B2 on the first battery-mount part 41.

Furthermore, the battery-mount parts 41, 42 are also preferably spaced or arranged such that it is not physically possible to simultaneously mount the first battery B1 and the second battery B2 on the first battery-mount part 41 and the second battery-mount part 42 owing to spatial hindrance. That is, the spacing between the rear-side guide rail 41r of the first battery-mount part 41 and the front-side guide rail 42r of the second battery-mount part 42 is set to a dimension such that the first battery B1 and the second battery B2 would spatially interfere with one another. Consequently, if, for example, the second battery B2 is slid downward with respect to the second battery-mount part 42 while the first battery B1 is already mounted on the first battery-mount part 41, then the second battery B2 makes contact with the first battery B1 and thereby is prevented from being slid further downward to its mounted state. Similarly, if the first battery B1 is slid downward with respect to the first battery-mount part 41 while the second battery B2 is already mounted on the second battery-mount part 42, then likewise the first battery B1 is prevented from being slid further downward to its mounted state.

The cover member 45 may be a generally plate-shaped member that is configured to cover the first battery-mount part 41 or the second battery-mount part 42 and is provided on the battery-mount part 40 such that it is capable of being slid in the front-rear direction. That is, guide grooves 40g extending in the front-rear direction are formed above and below the battery-mount part 40, and sliders (not shown), which are formed above and below a rear side of the cover member 45, are coupled to the guide grooves 40g such that the sliders are slidable with respect to the guide grooves 40g. In addition, recessed handles 45e (refer to FIG. 1), which can be hooked by the user's fingers, are formed in the front side and the rear side of the surface of the cover member 45 to facilitate the manual movement of the cover member 45. Furthermore, as shown in FIG. 3, by sliding the cover member 45 to its rearmost position, the second battery-mount part 42 is covered and the first battery-mount part 41 is exposed, and thereby it becomes possible to mount the first battery B1 on the first battery-mount part 41. In addition, as shown in FIG. 10, by sliding the cover member 45 to its frontmost position, the first battery-mount part 41 is covered and the second battery-mount part 42 is exposed, and thereby it becomes possible to mount the second battery B2 on the second battery-mount part 42. A cover-operation switch 64 (refer to FIGS. 16 17), which operates in conjunction with the front-rear sliding operation of the cover member 45, is provided on the battery-mount part 40.

Water-Heating Element 50 of the Coffeemaker-Main-Body 20

Figure 11:
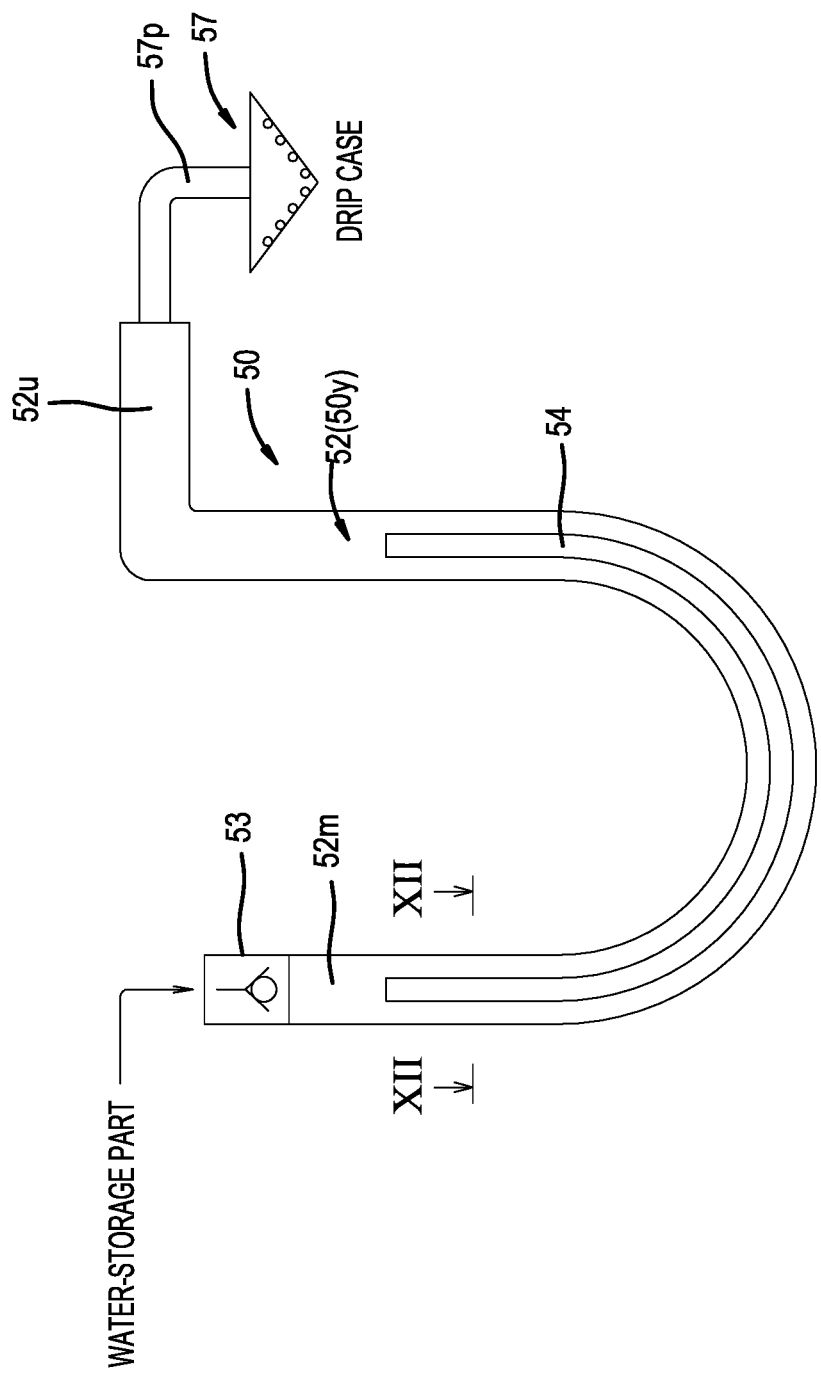
FIG. 11 is a schematic drawing of a water-heating element of the coffeemaker.
Figure 12:
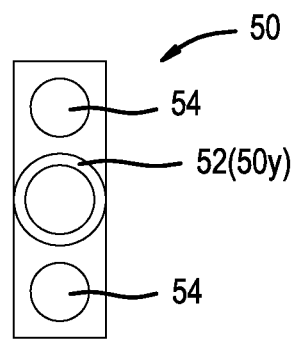
FIG. 12 is a plan cross-sectional view (an auxiliary cross-sectional view taken along line XII-XII in FIG. 11) of the water-heating element.

The water-heating element 50 is a device that heats/boils the water supplied from the water reservoir 22w of the housing 22 and supplies that heated/boiled water to the interior of the drip case 21. As shown in FIG. 11, the water-heating element 50 comprises a hot water supply 50y and at least one heater 54. The hot water supply 50y comprises: a pipe 52, which is connected to the water reservoir 22w, a check valve (one-way valve) 53, which prevents the water inside the pipe 52 from flowing in reverse towards the water reservoir 22w, and a hot water supply nozzle ("shower head", water distribution disk, etc.) 57, which is connected to a tip part 52u of the pipe 52. Furthermore, as shown in FIG. 11 and FIG. 12, a pair of the heaters 54 is mounted, such that they are arranged along a substantially U-shaped curved portion of the pipe 52 of the hot water supply 50y. The heaters 54 may be, e.g., resistive heating elements, such as a wire or other conductive material that heats up when a current is supplied to it. The check valve 53 forms a part of a passageway or conduit from the water reservoir 22w to the water-heating element 50.

Figure 15:
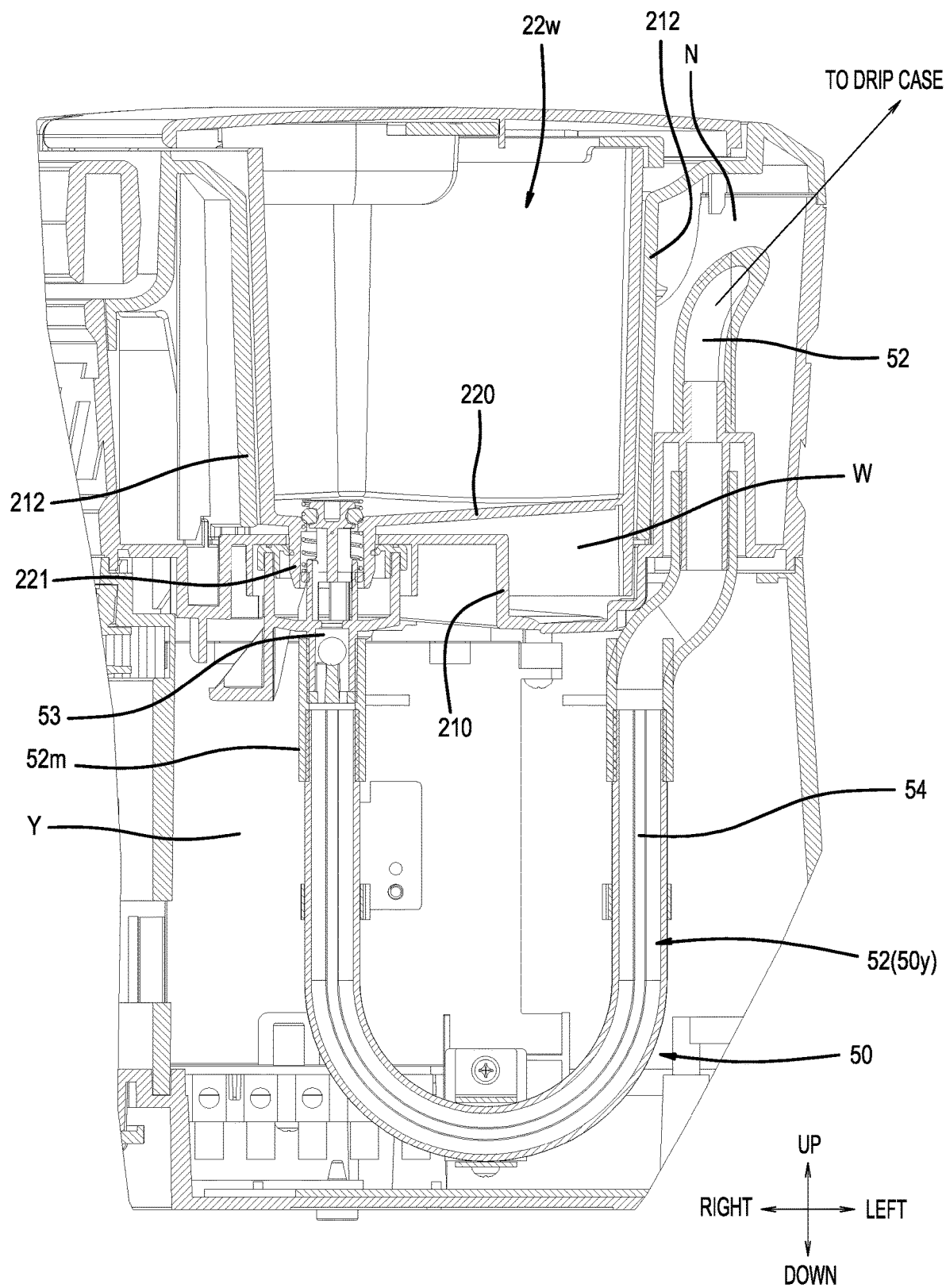
FIG. 15 is a longitudinal cross-sectional view (2) that shows the water-heating element, etc., of the coffeemaker.

As shown in FIG. 13 and FIG. 15, the water reservoir 22w of the housing 22 comprises an upward-opening-type container (reservoir tank) 220. In addition, a valve housing 221 protrudes (extends) downward and is provided at the location of a bottom plate of the container 220. Furthermore, the check valve 53 of the hot water supply 50y is housed inside the valve housing 221 of the container 220 of the water reservoir 22w. A base end 52m of the pipe 52 of the hot water supply 50y is connected to the valve housing 221.

Inside the housing 22, as shown in FIG. 13, a water reservoir space W, which houses the container 220 of the water reservoir 22w, and a water-heating space Y, which houses the water-heating element 50, are partitioned by an up/down-partition wall 210, i.e. by a horizontally extending wall 210. Furthermore, the valve housing 221 of the container 220 of the water reservoir 22w passes through the up/down-partition wall 210 and protrudes into the water-heating space Y. As shown in FIG. 15, the pipe 52 of the hot water supply 50y is bent into a U-shape and is disposed in the interior of the water-heating space Y. Furthermore, as described above, because the pair of heaters 54 is arranged along the U-shaped curved portion of the pipe 52, it becomes possible to boil the water held in the U-shaped curved portion using the heaters 54. A tip side of the U-shaped curved portion of the pipe 52 extends upward and is led into the drip-case-holder 22f of the housing 22.

Figure 14:
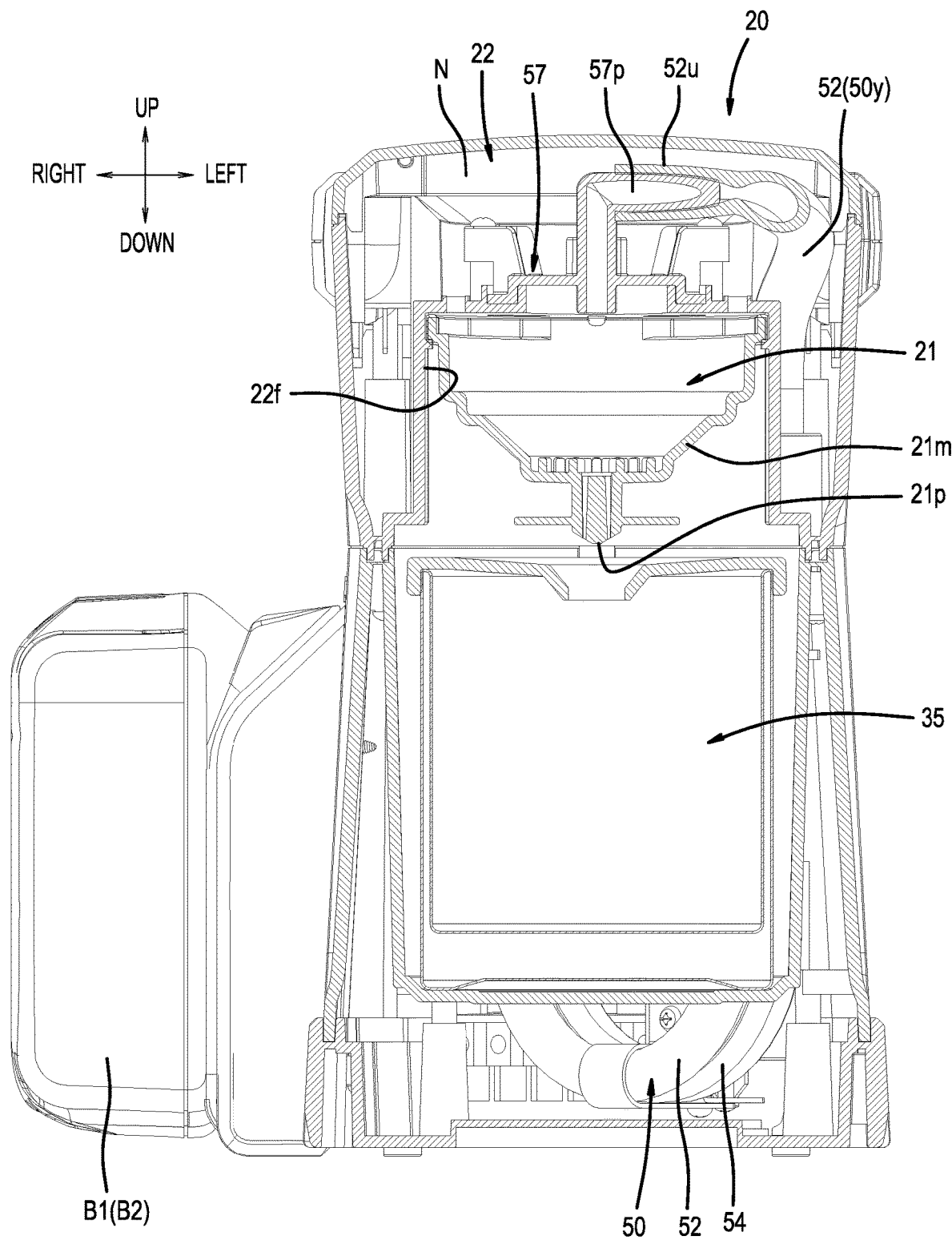
FIG. 14 is an auxiliary cross-sectional view taken along line XIV-XIV in FIG. 13.

As shown in FIG. 13, the hot water supply nozzle 57 of the hot water supply 50y, which discharges the hot water into the drip case 21 from above, is installed in the drip-case-holder 22f of the housing 22. Furthermore, as shown in FIG. 14, the tip part 52u of the pipe 52 of the hot water supply 50y is connected to an upper end of an upright pipe 57p of the hot water supply nozzle 57. In this embodiment, a nozzle-housing space N of the drip-case-holder 22f, in which the hot water supply nozzle 57 of the hot water supply 50y is housed, is partitioned from the water reservoir space W and the water-heating space Y by a longitudinal wall 212, as shown in FIG. 13, etc. Therefore, no water or hot water can enter the water-heating space Y, in which the heaters 54 are housed.

According to the above-described configuration, when the pipe 52 is heated by the heaters 54 and the substantially U-shaped curved portion of the pipe 52 is filled with water, some of the water inside the pipe 52 vaporizes, and thereby the pressure inside the pipe 52 rises. At this time, because the check valve 53 of the hot water supply 50y is closed and thereby water is prevented from flowing in reverse towards the water reservoir 22w, high temperature hot water transits the pipe 52 of the hot water supply 50y and is forced out from the hot water supply nozzle 57 into the nozzle-housing space N. Therefore, hot water from the hot water supply nozzle 57 is discharged, from above, to the coffee pod CP inside the drip case 21. Furthermore, when the pressure inside the pipe 52 drops owing to hot water being forced out from the hot water supply nozzle 57, water from the water reservoir 22w is supplied into the pipe 52 via the check valve 53. By repeatedly performing this operation, high temperature hot water is supplied into the drip case 21 automatically. That is, the heaters 54 correspond to a heat-generating means of the present teachings.

Electrical Circuit 60 of the Coffeemaker-Main-Body 20

The electrical circuit 60 supplies electric power from the first battery B1, which is mounted on the first battery-mount part 41, or from the second battery B2, which is mounted on the second battery-mount part 42, to the heater(s) 54 of the water-heating element 50.

As shown in FIG. 16 and FIG. 17, the electrical circuit 60 comprises: a first power-supply positive line 61, which connects the positive terminal 41p of the first battery-mount part 41 and the heater(s) 54 (+ side) of the water-heating element 50, and a second power-supply positive line 62, which connects the positive terminal 42p of the second battery-mount part 42 and the heater(s) 54 (+ side). In addition, the electrical circuit 60 comprises a power-supply negative line 63, which connects the negative terminals 41n, 42n of the first and second battery-mount parts 41, 42 and the heater(s) 54 (− side). That is, the first power-supply positive line 61 and the second power-supply positive line 62 correspond to a power-supply line of the present teachings, and the positive terminal 41p of the first battery-mount part 41 and the positive terminal 42p of the second battery-mount part 42 correspond to power-supply terminals of a battery-mount part of the present teachings.

Furthermore, a short-circuit-preventing fuse Hs is provided in each of the first and second power-supply positive lines 61, 62. As shown in FIG. 16, if, for example, the positive terminal 42p and the negative terminal 42n of the second battery-mount part 42 mistakenly short circuit when the first battery B1 of the first battery-mount part 41 is mounted, then the short-circuit-preventing fuses Hs cut off the short-circuit current.

The cover-operation switch 64, which operates in conjunction (accordance) with the front-rear sliding operation of the cover member 45, is provided in series with the first power-supply positive line 61 and the second power-supply positive line 62 of the electrical circuit 60. That is, as shown in FIG. 16, when the cover member 45 is covering the second battery-mount part 42, the cover-operation switch 64 disconnects the second power-supply positive line 62 between the second battery-mount part 42 and the heater(s) 54 and connects the first power-supply positive line 61 between the first battery-mount part 41 and the heater(s) 54. Similarly, as shown in FIG. 17, when the cover member 45 is covering the first battery-mount part 41, the cover-operation switch 64 disconnects the first power-supply positive line 61 between the first battery-mount part 41 and the heater(s) 54 and connects the second power-supply positive line 62 between the second battery-mount part 42 and the heater(s) 54. It is noted that the cover-operation switch 64 is configured such that, if the cover member 45 is removed from the battery-mount part 40, then the first power-supply positive line 61 and the second power-supply positive line 62 are disconnected, thereby preventing further usage of the coffeemaker 10. This disconnection function is represented by the arrow extending from the cover-operation switch 64 to the controller 70 in FIGS. 16 and 17.

As shown in FIG. 16 and FIG. 17, a switching device (FET) 65 for PWM control of the electric power supplied to the heaters 54 is provided in the power-supply negative line 63 of the electrical circuit 60. In addition, heater fuse(s) Ht, which melt(s) if the temperature of the heater(s) 54 rise(s) excessively, is (are) provided on the heater(s) 54. Furthermore, a temperature sensor 66 (e.g., a thermistor), which detects the temperature of the pipe 52, is provided on the pipe 52 of the water-heating element 50.

The electrical circuit 60 comprises a controller 70, which controls the heater(s) 54 of the water-heating element 50 by operating the switching device (FET) 65 according to PWM (pulse width modulation) control. A signal of a start/stop switch 72 for turning the heater(s) 54 of the water-heating element 50 ON and OFF is input to the controller 70. Here, as shown in FIG. 1, etc., the start/stop switch 72 is mounted on a front surface of the plate 30. It is noted that the "Energized" lamp is turned ON during operation of the heater(s) 54. In addition, a signal of the temperature sensor 66 is input to the controller 70. Furthermore, a battery-identification signal from a battery identifying circuit 74 is input to the controller 70. The battery identifying circuit 74 identifies the type of battery based on data sent from the battery B1, which is mounted on the first battery-mount part 41, or from the battery B2, which is mounted on the second battery-mount part 42. In addition, the battery type may be identified by ascertaining on which battery-mount part the battery is mounted, i.e., whether a battery is physically mounted on the first battery-mount part 41 or on the second battery-mount part 42, e.g., using a pressure switch or an electrical contact switch.

In addition, a constant voltage is supplied from a control-power-supply 75 to the controller 70. That is, the control-power-supply 75 is configured such that the constant voltage can be supplied to the controller 70 by stepping up or stepping down the voltage supplied from the battery B1 (14.4 V or 18 V) or the battery B2 (10.8 V).

Operation of the Coffeemaker 10

When the coffeemaker 10 is to be utilized with, for example, the first power tool battery B1 (18 V), then, as shown in FIG. 1, the cover member 45 is slid to its rearmost position to cover the second battery-mount part 42, and the first battery B1 is mounted on the first battery-mount part 41, which is exposed. At this time, the cover-operation switch 64 operates in conjunction with the slide operation of the cover member 45 and, as shown in FIG. 16, the second power-supply positive line 62 is disconnected and the first power-supply positive line 61 enters a conducting state. Next, the lid 23 on the upper surface of the housing 22 is pivoted upward such that, as shown in FIG. 2, the opening of the water reservoir 22w is held open while the lid 23 is in its raised position. Furthermore, in this state, water is poured into the water reservoir 22w. At this time, even if some of the water splashes, the splashed water is blocked by the lid 23 and tends not to spray in the direction of the first battery B1. Then, when the pouring of the water has been completed, coffee grounds have been placed in the drip case 21, and the decanter 35 has been set on the plate 30, the start/stop switch 72 is operated, e.g., manually depressed.

When the start/stop switch 72 is operated, the controller 70 operates the switching device (FET) 65 in accordance with the battery type (voltage) and thereby adjusts the electric power supplied to the heater(s) 54. For example, when the first battery B1 (18 V) is mounted, the energized time during PWM control is shorter compared with of the energized time when the second battery B2 (10.8 V) is mounted. In the alternative, the energized time during PWM control may be keep the same, such that the water will heat up faster when the first battery B1 is mounted than when the second battery B2 is mounted. Furthermore, the pipe 52 of the water-heating element 50 is heated by the heater(s) 54, and the high temperature hot water inside the pipe 52 is supplied to the coffee pod CP of the drip case 21. Thereafter, the brewed coffee flows downwardly through the extraction part 21p of the drip case 21 (the case-main-body 21m) and collects in the decanter 35 on the plate 30. Thereafter, when the amount of water inside the pipe 52 of the water-heating element 50 decreases and the temperature of the pipe 52 rises, the controller 70, which receives the signal of the temperature sensor 66, turns the switching device (FET) 65 OFF, and stops energizing the heater(s) 54.

If the second battery B2 (10.8 V) is used, then, as shown in FIG. 9 and FIG. 10, the cover member 45 is slid to its frontmost position to cover the first battery-mount part 41, and the second battery B2 is mounted on the second battery-mount part 42, which is exposed. Furthermore, by sliding the cover member 45 to the front-end position, the cover-operation switch 64 disconnects the first power-supply positive line 61 and connects the second power-supply positive line 62, as shown in FIG. 17. Then, similar to the above-described procedure, coffee is brewed by operating the coffeemaker 10.

Features of the Coffeemaker 10 According to the Present Embodiment

According to the coffeemaker 10 of the present (first) embodiment, the coffeemaker 10 (the electrical device) can be operated, e.g., at a construction work site, etc., using the batteries B1, B2 of a power tool. The coffeemaker 10 comprises the drip case 21 (the case) that holds, e.g., a coffee pod CP (the pod) containing a predetermined amount of coffee grounds held in a permeable bag-shaped element. Furthermore, the extraction part 21p, which allows the coffee produced by the hot water discharged into (onto) the coffee pod CP to downwardly flow, is provided in (on) the drip case 21. Thus, because a coffee pod CP can be used, it becomes unnecessary to, for example, use a measuring spoon or the like to take coffee grounds out of a coffee-ground bag and place them in a filter. That is, because coffee can be brewed merely by setting the coffee pod CP in the drip case 21 and operating the coffeemaker 10, coffee can be easily made at a construction work site. However, as was discussed above in connection with FIGS. 7 and 8, the coffeemaker 10 also may be advantageously utilized with loose coffee grounds, loose tea leaves, etc., in other embodiments of the present teachings, e.g., by providing a mesh filter F or paper filter in the drip case 21.

In addition or in the alternative, if the water reservoir 22w and the drip case 21 (the case) of the coffeemaker 10 are disposed such that they are side-by-side at substantially the same height, when the hot water supply 50y supplies the hot water boiled by the heater(s) 54 (the heat-generating means) to the drip case 21 from above, a water-supplying means, such as a pump, is unnecessary. In addition or in the alternative, if the battery-mount parts 41, 42 are provided at locations lower than those of the water reservoir 22w and the drip case 21, when water is being boiled, the batteries B1, B2, which are heavy, are disposed at low locations, which improves the stability of the coffeemaker 10. In addition or in the alternative, if the water reservoir space W and the water-heating space Y, in which the heaters 54 are housed, are partitioned by the up/down-partition wall 210, water is prevented from entering the space Y in which the heaters 54 are housed. In addition or in the alternative, if the nozzle-housing space N, in which the hot water supply nozzle 57 of the hot water supply 50y is housed, and the water-heating space Y, in which the heaters 54 are housed, are partitioned by the longitudinal wall(s) 212, hot water is prevented from entering the water-heating space Y.

According to the coffeemaker 10 of the present first embodiment, when one of the batteries B1, B2 is mounted on its corresponding battery-mount part 41 or 42, it becomes impossible to mount the other battery B1 or B2 on the other battery-mount part 41 or 42. Consequently, even though two types of the battery-mount parts 41, 42 are provided, only one of the batteries B1, B2 can be mounted on the battery-mount parts 41, 42. That is, two batteries are never mounted on the battery-mount parts 41, 42 simultaneously (at the same time). As a result, a battery-switching circuit, an interlock circuit, etc., are not necessary, the circuit configuration is simplified, and electrical reliability is improved.

In addition or in the alternative, when one of the batteries B1, B2 is mounted on the sole exposed battery-mount part 41 or 42, the other battery-mount part 41 or 42 is necessarily covered by the cover member 45. That is, when one of the batteries B1, B2 is mounted on one of the battery-mount parts 41, 42, the positive and negative terminals (charging part) of the other battery-mount part 41 or 42 are not exposed, and consequently a short-circuit fault can be prevented. In addition, when one of the batteries B1, B2 is mounted on one of the battery-mount parts 41, 42, if the other battery B1 or B2 is moved in the mounting direction (the downward direction) with respect to the other battery-mount part 41 or 42, then that other battery B1 or B2 makes contact with the battery B1 or B2 mounted on the one battery-mount part 41 or 42, thereby blocking further downward sliding movement of that other battery B1 or B2. Consequently, even in a hypothetical situation in which the cover member 45 has been removed, a plurality of the batteries B1, B2 can not be mounted on the plurality of the battery-mount parts 41, 42 at the same time.

In addition or in the alternative, the lid 23 of the water reservoir 22w is located on an upper side of the right-side surface of the housing 22 on which the battery-mount parts 41, 42 are provided, and is configured such that it stands up like a wall along the end edge of the upper surface of that housing, such that the opening of the water reservoir 22w is uncovered (opened). Consequently, when the water is being supplied (poured) into the water reservoir 22w of the housing 22, any water that splashes is blocked by the lid 23, which stands up along the right-side surface of the housing 22, such that the splashed water does not splash onto the battery-mount parts 41, 42.

Modified Examples (Second to Fifth Embodiments)

Figure 20:
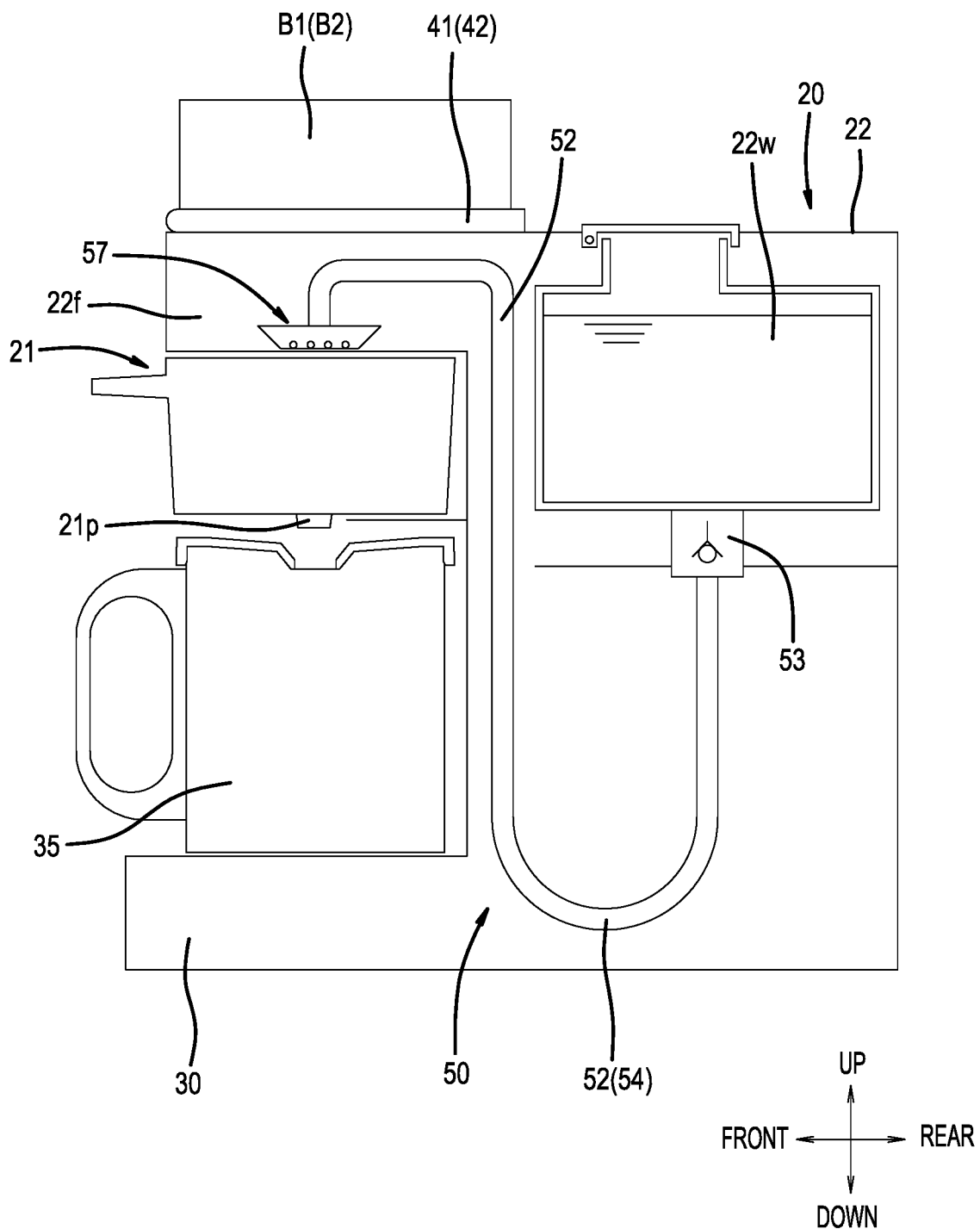
FIG. 20 is a schematic side view of the coffeemaker according to a third modified example.
Figure 21:
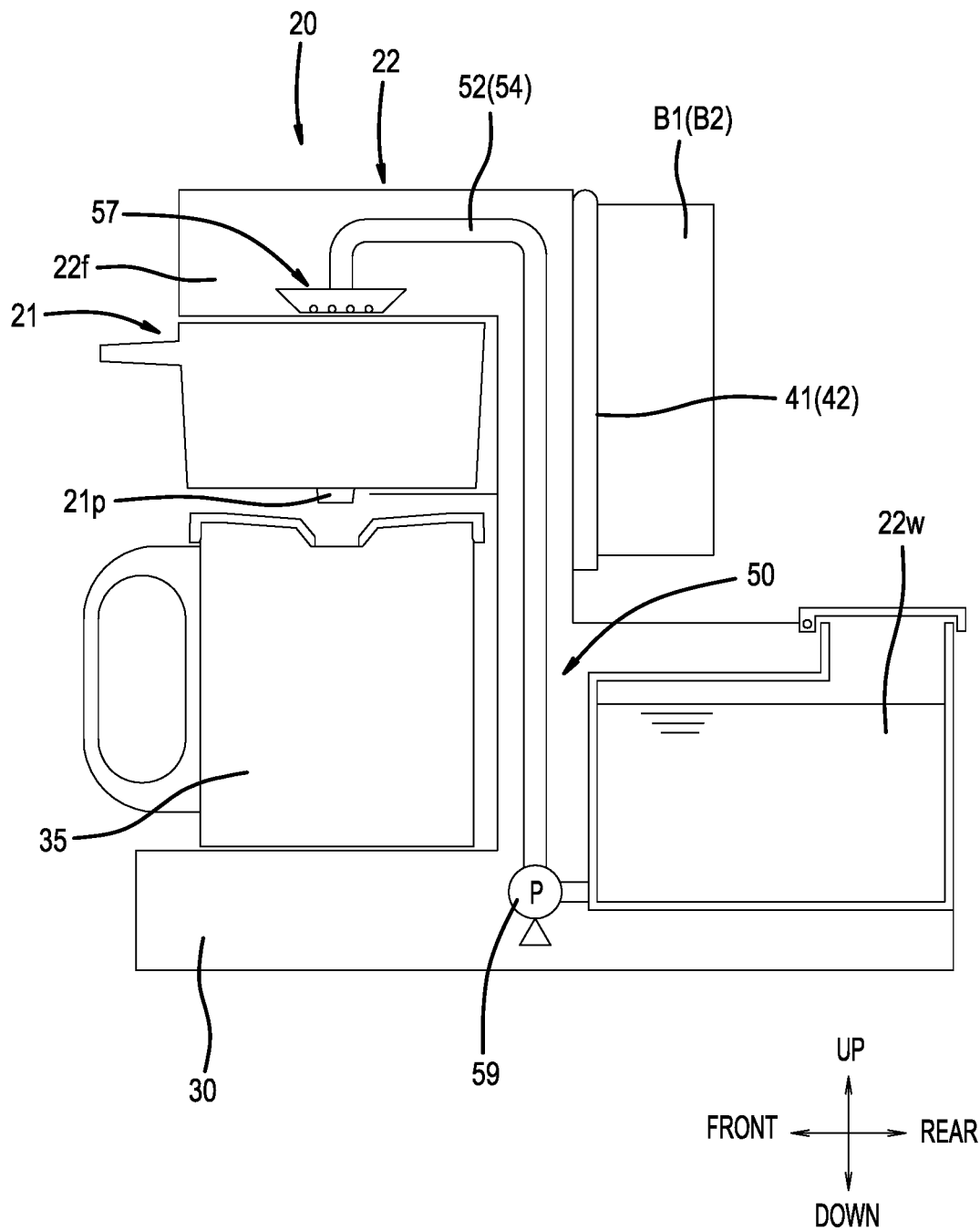
FIG. 21 is a schematic side view of the coffeemaker according to a fourth modified example.
Figure 22:
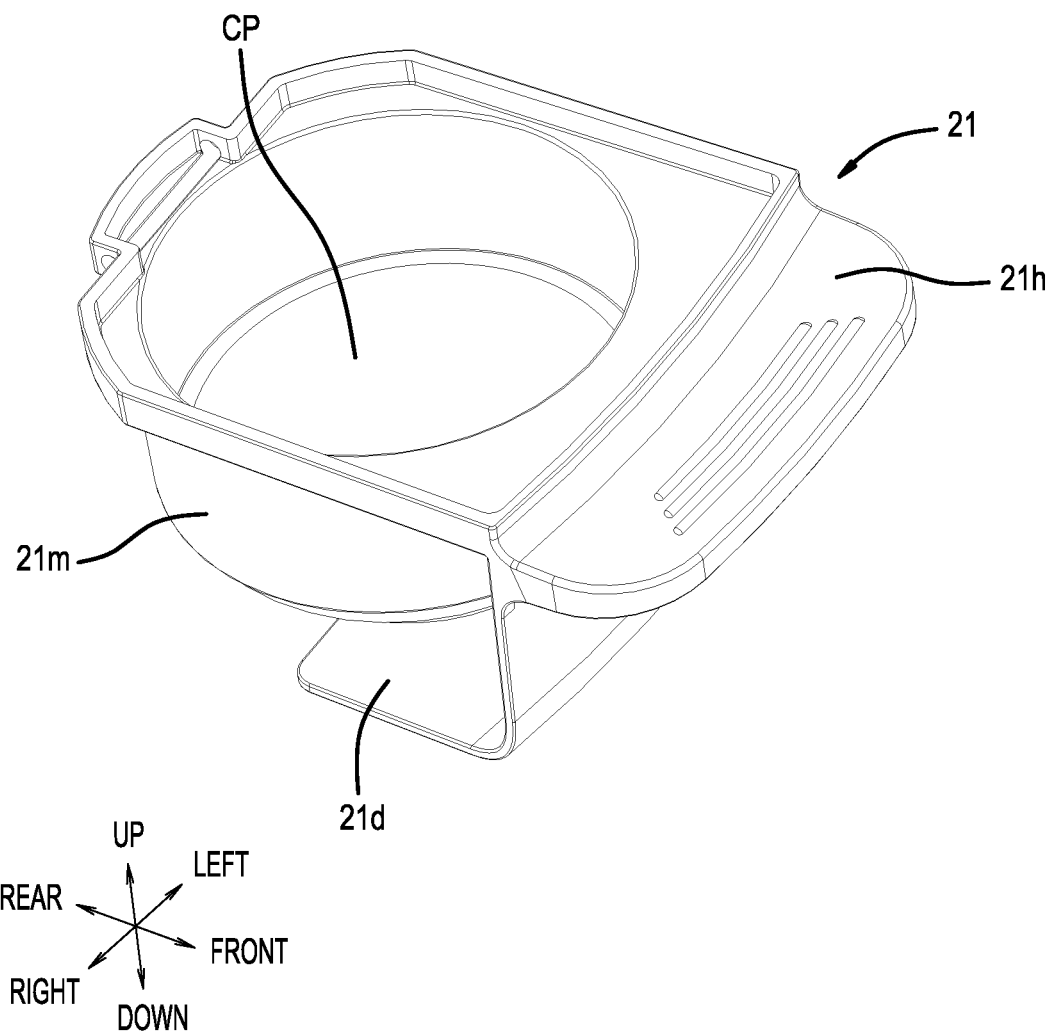
FIG. 22 is an oblique view of the drip case of the coffeemaker according to a fifth modified example.
Figure 23:
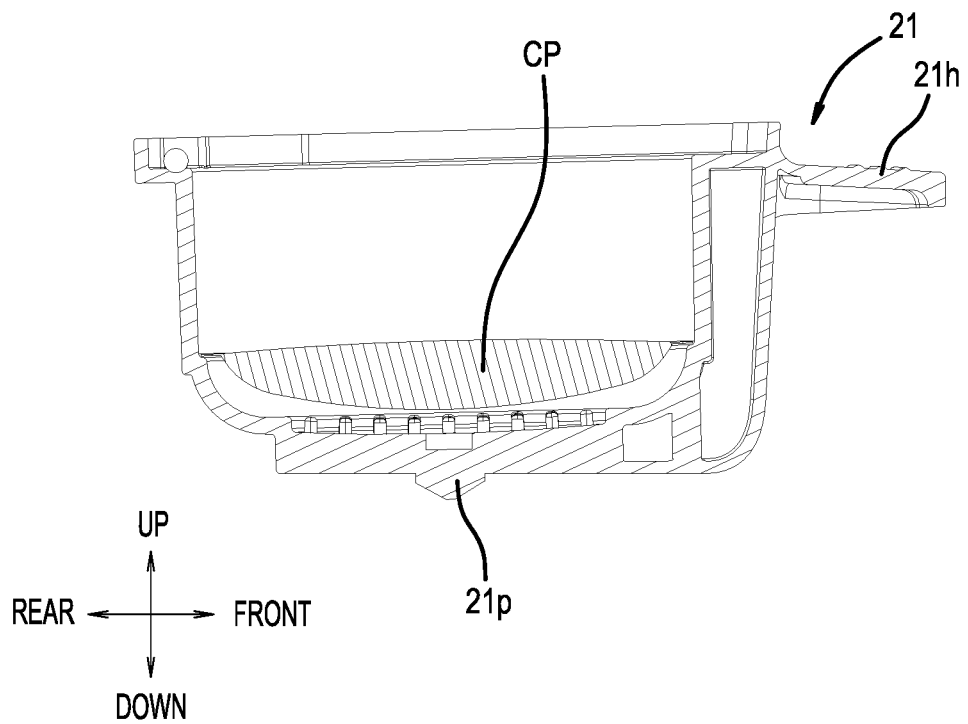
FIG. 23 is a longitudinal cross-sectional view of the drip case of FIG. 6.
Figure 24:
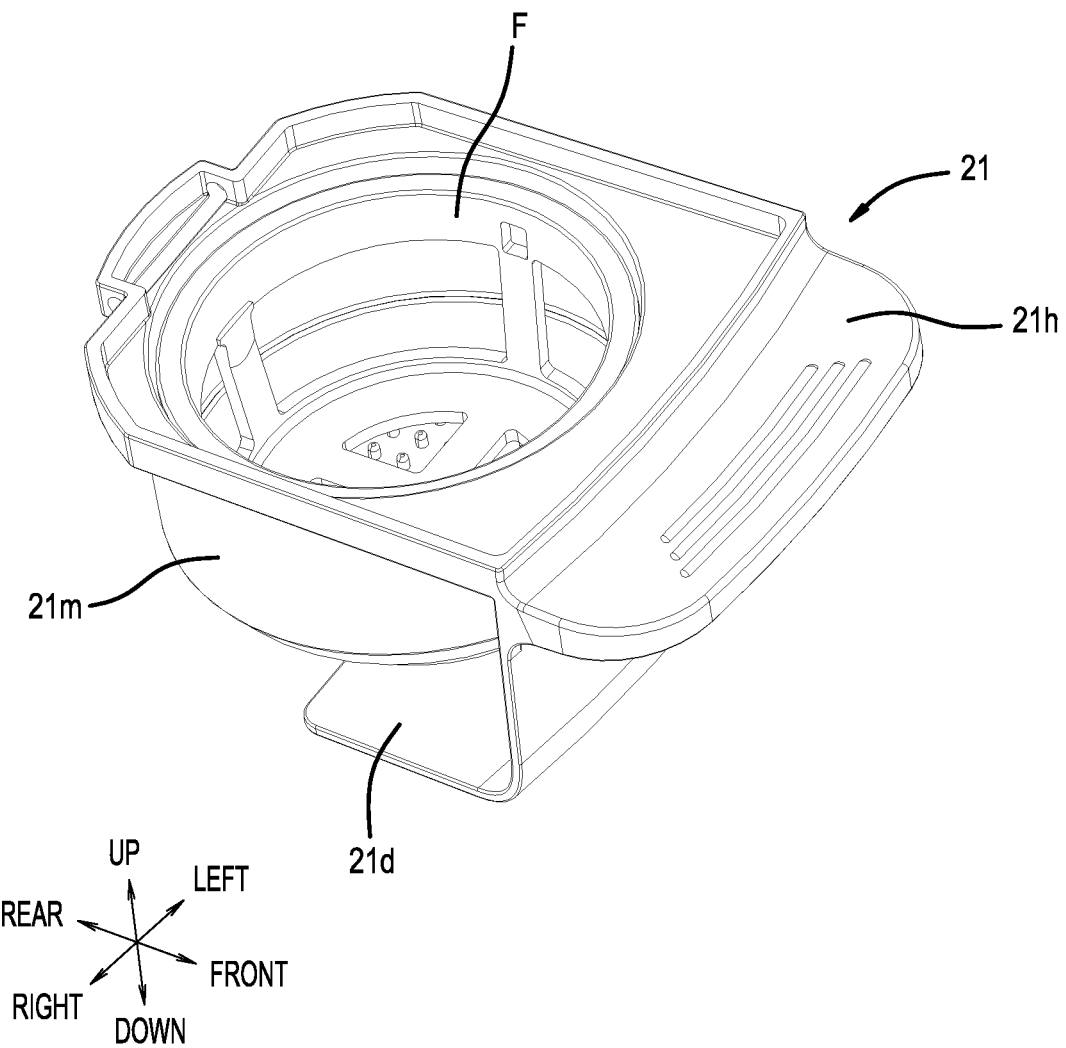
FIG. 24 is an oblique view of the drip case.
Figure 25:
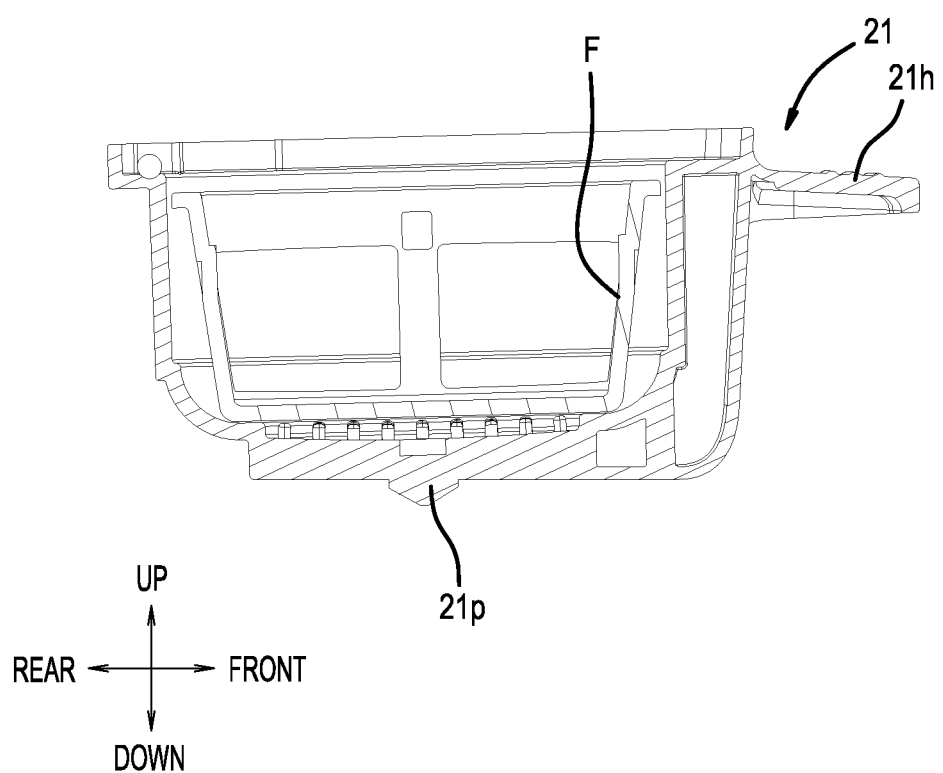
FIG. 25 is a longitudinal cross-sectional view of the drip case.
Figure 26:
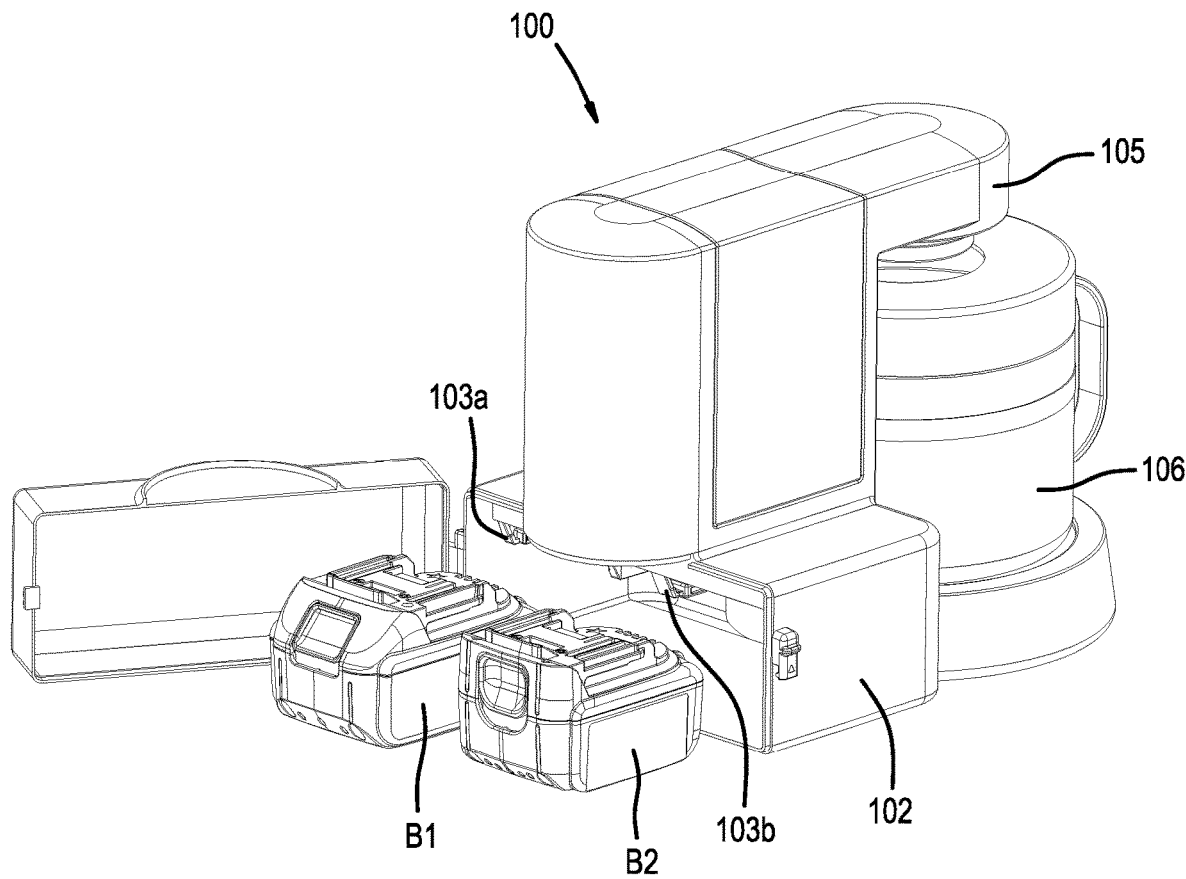
FIG. 26 is an overall oblique view of a known coffeemaker.

It is noted that the present teachings are not limited to the above-described embodiments, and it is understood that variations and modifications may be effected without departing from the spirit and scope of the present teachings. For example, in the coffeemaker 10 of the first embodiment, as shown in FIG. 1 and FIG. 13, an example is described in which the water reservoir 22w and the drip case 21 (the case) are disposed such that they are side-by-side at substantially the same height, and the battery-mount parts 41, 42 are provided at a location lower than that height. However, as shown in FIG. 20, it is also possible to provide the battery-mount parts 41, 42 at a location higher than those of the water reservoir 22w and the drip case 21 (the case). In addition, as shown in FIG. 21, it is also possible to provide the water reservoir 22w at a location lower than that of the heater(s) 54 of the water-heating element 50 and to provide the battery-mount parts 41, 42 at a location higher than that of the water reservoir 22w. In this embodiment, a pump 59 or the like, which pumps the water upward, is used. Thus, by disposing the battery-mount parts 41, 42 at a location higher than that of the water reservoir 22w, when the water is being supplied (poured) to the water reservoir 22w, it is less likely that the water will splash onto the battery-mount parts 41, 42.

Figure 18:
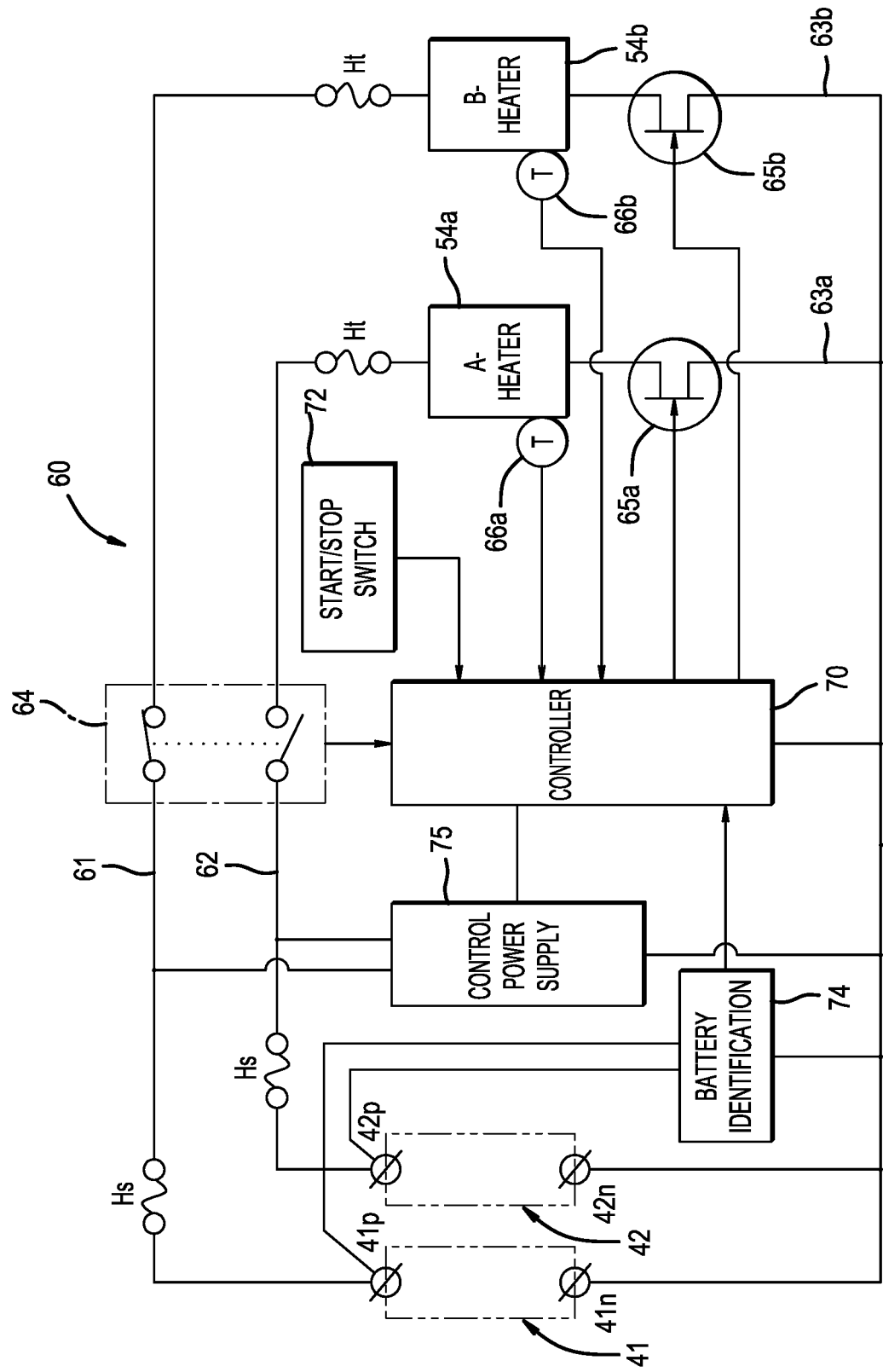
FIG. 18 is an electrical-circuit diagram of the coffeemaker according to a first modified example.
Figure 19:
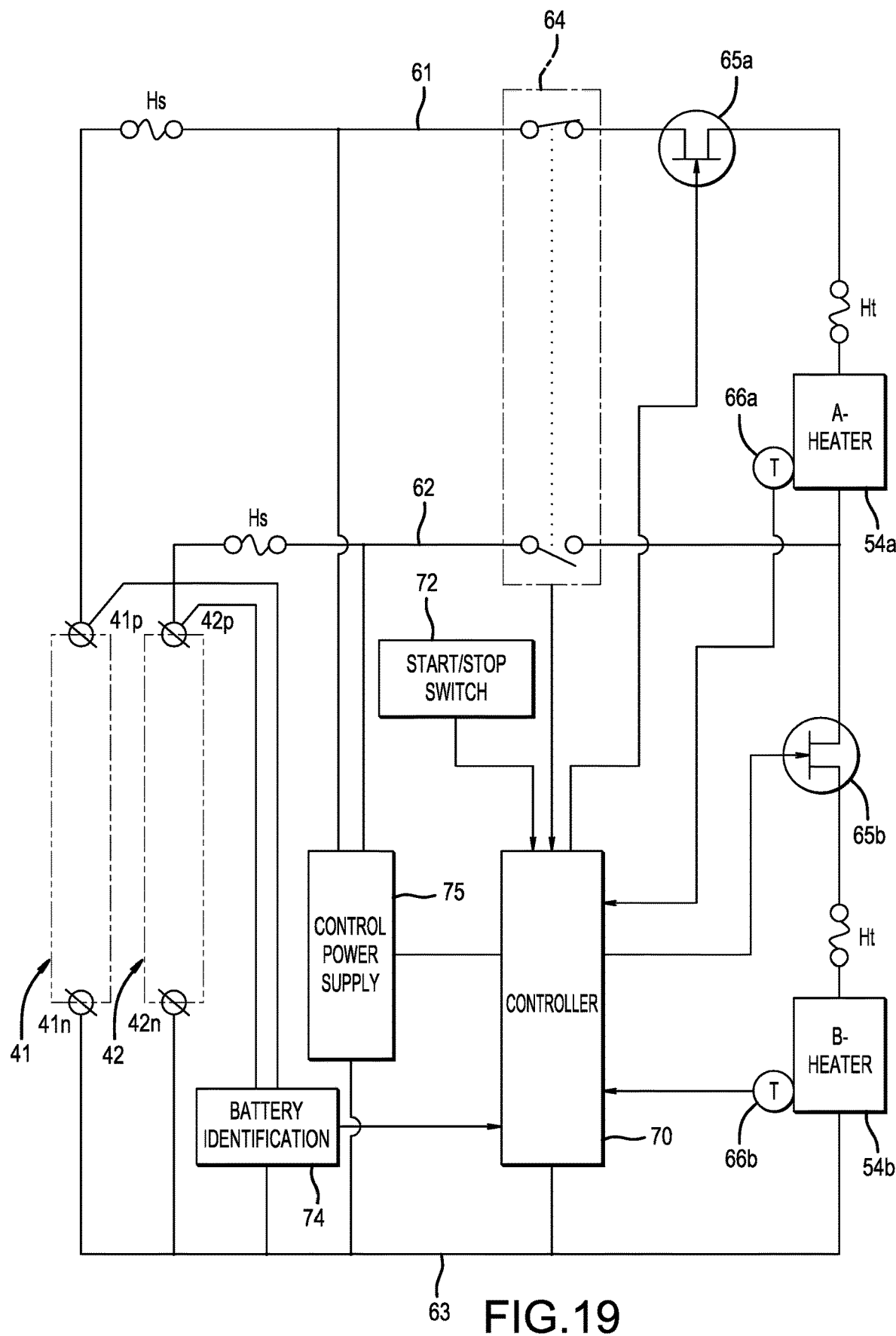
FIG. 19 is an electrical circuit of the coffeemaker according to a second modified example.

In addition, in the coffeemaker 10 of the above-described first embodiment, an example was described in which, as shown in the electrical circuit 60 in FIG. 16 and FIG. 17, the heater(s) 54 is (are) commonly used for both the situation in which the first battery B1 (18 V) is used (mounted) and the situation in which the second battery B2 (10.8 V) is used (mounted). However, as shown in FIG. 18, a configuration is also possible in which a dedicated A-heater 54a and a dedicated FET 65a are used for the situation in which the first battery B1 (18 V) is used (mounted), and a dedicated B-heater 54b and a dedicated FET 65b are used for the situation in which the second battery B2 (10.8 V) is used (mounted). Dedicated temperature sensors 66a (e.g., thermistors) are respectively provided on or near the heaters 54a, 54b and respective dedicated power-supply negative lines 63a, 63b are provided for the two heaters 54a, 54b. In addition, as shown in FIG. 19, a configuration is also possible in which the A-heater 54a, the B-heater 54b, the FET 65a, and the FET 65b are used for the situation in which the first battery B1 (18 V) is used (mounted), and the B-heater 54b and the FET 65b are used for the case in which the second battery B2 (10.8 V) is used (mounted).

In addition, in the above-described first embodiment, although an example was described in which a contact-type switch is used as the cover-operation switch 64 that operates in conjunction with the front-rear sliding operation of the cover member 45, it is also possible to use a semiconductor-type switch. In addition, in the above-described first embodiment, an example was described in which the coffeemaker 10 comprises the first battery-mount part 41 and the second battery-mount part 42, the sizes of which differ and correspond to the first battery B1 and the second battery B2. However, it is also possible, for example, to make the first battery-mount part 41 and the second battery-mount part 42 of identical sizes, corresponding to the first battery B1 (18 V, 14.4 V). In addition, in the coffeemaker 10 according to the above-described first embodiment, although a warming function of the plate 30 on which the decanter 35 is placed was not considered, it is also possible to provide the plate 30 with a warming function. In such an embodiment, in the electrical circuits 60 shown in FIG. 16, etc., a warming heater for the plate 30 may be provided in parallel with the heater(s) 54 of the water-heating element 50 and the switching device 65. In the alternative, the heater(s) 54 may be disposed between the pipe 52 and the plate 30 so that the same heater(s) 54 heat(s) both the pipe 52 and the plate 30.

In addition, in the above-described first embodiment, an example was described in which, if the case-main-body 21m of the drip case 21 is designed for use with the coffee pod CP shown in FIG. 5 and FIG. 6, then a second drip case 21 designed for use with coffee grounds, in which the mesh filter F shown in FIG. 7 and FIG. 8 is used, may be provided separately. However, as shown in FIG. 22 to FIG. 25, it is also possible to make the case-main-body 21m multi-usable with the coffee pod CP and also with loose coffee grounds in which the mesh filter F is used. In addition, in the above-described first embodiment, although an example was described in which the coffeemaker 10 serves as the electrical device, it is also possible to adapt the present teachings to a tea maker and the like, in which a tea-leaf pod, loose tea leaves, etc. is used.

Depending on design requirements, exemplary embodiments of the controller 70 of the present disclosure may be implemented in hardware and/or in software. The controller 70 can be configured using a digital storage medium, for example one or more of a ROM, a PROM, an EPROM, an EEPROM, a flash memory, etc., on which electronically readable control signals (program code—instructions) are stored, which interact or can interact with one or more programmable hardware components to execute programmed functions.

The (each) programmable hardware component can be constituted by a processor, which may comprise a computer processor (CPU=central processing unit), an application-specific integrated circuit (ASIC), an integrated circuit (IC), a computer, a system-on-a-chip (SOC), a programmable logic element, and/or a field programmable gate array (FGPA). A microprocessor is a typical component of a controller 70 or processor according to the present teachings.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods or functions described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller 70 or processor, are implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier, such as any of the types of digital storage media described above. The program code or the data can be, among other things, source code, machine code, bytecode or another intermediate code.

A program according to an exemplary embodiment can implement one of the methods or function during its performance, for example, such that the program reads storage locations and/or writes one or more data elements into these storage locations, wherein switching operations or other operations are induced in transistor structures, in amplifier structures, or in other electrical, electronic, optical, magnetic components, or components based on another functional or physical principle. Correspondingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing in one or more storage locations, as well as control other apparatuses, machines, and components, and thus for example also perform any complex process that the air compressor may be designed to perform.

Although some aspects of the present teachings have been described in the context of a device or apparatus, it is to be understood that these aspects also represent a description of a corresponding method, so that a block or a component of a device or apparatus is also understood as a corresponding method step or as a feature of a method step. In an analogous manner, aspects which have been described in the context of or as a method step also represent a description of a corresponding block or detail or feature of a corresponding device.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electrical devices, such as hot beverage making devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional embodiment of the present teachings include, but are not limited to:

1. An electrical device comprising:
   a housing;
   two battery-mount parts disposed on the housing and configured to mount two batteries designed for use as a power supply of a power tool thereon;
   a heat-generating means for boiling water by using electric power supplied by the battery mounted on the battery-mount part, the heat-generating means being disposed within the housing;
   a drip case mountable in the housing and having a drain hole configured to allow a hot beverage to flow downwardly out of the drip case; and
   a hot water supply configured to automatically supply water boiled by the heat-generating means into an interior portion of the drip case;
   wherein the two battery-mount parts are configured such that, when one battery is mounted on one of the battery-mount parts, another battery is prevented from being mounted on the other battery-mount part.

2. The electrical device according to the above-described embodiment 1, wherein the two battery-mount parts have different sizes and are configured to respectively mount batteries having sizes corresponding to the battery-mount parts.

3. The electrical device according to the above-described embodiment 2, wherein:
   each of the two battery-mount parts comprises a pair of guide rails and a plurality of terminals; and
   the two battery-mount parts differ in the arrangement of the guide rails and/or in the arrangement of the plurality of terminals such that the batteries, which are capable of engaging with and sliding with respect to the pair of guide rails and are capable of electrically connecting to the terminals, are mountable on the respective battery-mount parts.

4. The electrical device according to the above-described embodiment 1-3, further comprising:
   a cover member movably coupled to the two battery-mount parts and configured to expose one of the battery-mount parts while covering the other battery-mount part.

5. The electrical device according to the above-described embodiment 4, wherein:
   the two battery-mount parts are disposed on the housing in a side-by-side arrangement; and
   the cover member is configured such that it is slidable in the side-by-side direction of the two battery-mount parts to expose one of the battery-mount parts while covering the other battery-mount part.

6. The electrical device according to the above-described embodiments 1-5, wherein the two battery-mount parts are configured such that, when one battery is mounted on one of the battery-mount parts, another battery is physically blocked by the mounted battery from moving in a mounting direction with respect to the other battery-mount part.

7. The electrical device according to the above-described embodiments 1-6, wherein:
   the two battery-mount parts are provided on one side surface of the housing;
   a lid is provided on an upper surface of the housing and is configured to close and open an opening of a water reservoir within the housing; and
   the lid is located on an upper side of the one side surface of the housing on which the battery-mount parts are provided, and is configured such that the lid stands up like a wall along an end edge of the upper surface of the housing when the opening of the water reservoir is opened.

8. The electrical device according to the above-described embodiment 7, wherein the lid is coupled by a hinge to the housing such that the lid is pivotable about the end edge of the upper surface of the housing.

9. The electrical device according to the above-described embodiments 4-8, further comprising:
   a cover-operation switch configured to be operated in conjunction with movement of the cover member;
   wherein the cover-operation switch is configured to disconnect a power-supply line between a power-supply terminal of the battery-mount part currently covered by the cover member and the heat-generating means, and to connect a power-supply line between a power-supply terminal of the currently exposed battery-mount part and the heat-generating means.

10. The electrical device according to the above-described embodiment 9, wherein the cover-operation switch is configured such that removal of the cover member from the battery-mount parts causes the power-supply line between the power-supply terminals of all the battery-mount parts and the heat-generating means to be disconnected.

EXPLANATION OF THE REFERENCE NUMBERS

10 Coffeemaker (electrical device)
22 Housing
210 Up/down-partition wall
212 Longitudinal wall
21 Drip case (case)
21*p* Extraction part
22*w* Water reservoir
23 Cover
24 Hinge mechanism
40 Battery-mount part
41 First battery-mount part 41p Positive terminal (power-supply terminal)
42 Second battery-mount part
42p Positive terminal (power-supply terminal)
45 Cover member
50 Water-heating element
50y Hot water supply
52 Pipe
53 Check valve
54 Heater (heat-generating means)
57 Hot water supply nozzle
60 Electrical circuit
61 First power-supply positive line (power-supply line)
62 Second power-supply positive line (power-supply line)
63 Power-supply negative line
64 Cover-operation switch
66 Temperature sensor
70 Controller
72 Start/stop switch
B1 First battery
B2 Second battery
CP Coffee pod (pod)

We claim:

1. An electrical device comprising:
a housing;
a plurality of battery-mount parts provided externally on the housing and configured such that batteries designed for use as a power supply of a power tool are respectively mountable thereon; and
a heat-generating means for boiling water by using electric power supplied by one of the batteries mounted on one of the battery-mount parts, the heat-generating means being disposed within the housing;
wherein the plurality of battery-mount parts is configured such that, when the one of the batteries is mounted on the one of the plurality of battery-mount parts, another one of the batteries, when placed adjacent to the mounted one of the batteries, is physically blocked by a cover member slidably mounted on the plurality of battery-mount parts or by the mounted one of the batteries from moving in a mounting direction with respect to the one of the plurality of battery-mount parts having the one of the batteries mounted thereon.

2. The electrical device according to claim 1, wherein at least two of the plurality of battery-mount parts have different sizes and are configured to respectively mount batteries having different sizes respectively corresponding to the at least two of the plurality of battery-mount parts.

3. The electrical device according to claim 1, wherein:
each of the plurality of battery-mount parts comprises a pair of guide rails and a plurality of terminals;
at least two of the plurality of battery-mount parts differ in an arrangement of the guide rails and/or in an arrangement of the plurality of terminals such that the batteries, which are capable of engaging with and sliding with respect to the pair of guide rails and are capable of electrically connecting to the terminals, are mountable on respective ones of the plurality of battery-mount parts.

4. The electrical device according to claim 1, wherein:
the plurality of battery-mount parts comprises a first battery-mount part and a second battery-mount part that are both provided externally on the housing; and
the cover member is configured to expose one of the first or second battery-mount parts while covering the other of the first or second battery-mount parts.

5. The electrical device according to claim 4, wherein:
the first and second battery-mount-parts are provided in a side-by-side arrangement; and
the cover member is configured such that the cover member is slidable in the side-by-side direction of the first and second battery-mount parts to expose one of the first or second battery-mount parts while covering the other of the first or second battery-mount parts.

6. The electrical device according to claim 4, further comprising:
a cover-operation switch configured to be operated in conjunction with movement of the cover member;
wherein the cover-operation switch is configured to disconnect a first power-supply line between a first power-supply terminal of the one of the first and second battery-mount parts currently covered by the cover member and the heat-generating means, and to connect a second power-supply line between a second power-supply terminal of the currently exposed one of the first and second battery-mount parts and the heat-generating means.

7. The electrical device according to claim 6, wherein the cover-operation switch is configured such that removal of the cover member from the first and second battery-mount parts causes the first and second power-supply lines to be disconnected.

8. The electric device according to claim 7, wherein:
the first battery-mount part comprises a first pair of guide rails configured for sliding engagement with one of the batteries,
the second battery-mount part comprises a second pair of guide rails configured for sliding engagement with another one of the batteries, and
the first and second pairs of guide rails are spaced apart from each other in a manner such that simultaneously mounting of two or more of the batteries on the plurality of battery-mount parts is prevented.

9. The electrical device according to claim 8, wherein:
the first and second battery-mount parts are disposed in a side-by-side arrangement; and
the first and second pairs of guide rails of the first and second battery-mount parts are spaced apart in a manner such that two of the batteries are prevented from being simultaneously mounted on the first and second battery-mount parts.

10. The electrical device according to claim 1, wherein the plurality of battery-mount parts is configured such that, when the one of the batteries is mounted on the one of the plurality of battery-mount parts, another one of the batteries, when placed adjacent to the mounted one of the batteries, is physically blocked by the mounted one of the batteries from moving in a mounting direction with respect to the one of the plurality of battery-mount parts having the one of the batteries mounted thereon.

11. The electrical device according to claim 1, wherein:
the plurality of battery-mount parts is provided on a planar side surface of the housing;
a lid is provided on an upper surface of the housing and is configured to close and open an opening of a water reservoir within the housing; and
the lid is located on an upper side of the planar side surface of the housing on which the plurality of battery-mount parts is provided, and is configured such that the lid stands up like a wall along an end edge of the upper surface of the housing when the opening of the water reservoir is opened.

12. The electrical device according to claim 11, wherein the lid is coupled by a hinge to the housing such that the lid is pivotable about the end edge of the upper surface of the housing.

13. The electrical device according to claim 1, further comprising:
   a drip case mountable in the housing and configured to hold a pod, which contains a predetermined amount of tea leaves or coffee grounds held in a water-permeable bag-shaped element; and
   a hot water supply configured to automatically supply water boiled by the heat-generating means to an interior portion of the drip case so that the boiled water is poured or otherwise dispersed onto the pod,
   wherein the drip case further includes an extraction part configured to allow a hot beverage produced by the water that has been poured onto the pod to flow downwardly out of the drip case.

14. The electrical device according to claim 1, further comprising the batteries.

15. An electrical device comprising:
   a housing having a water reservoir defined therein;
   a plurality of battery-mount parts provided externally on a planar side surface of the housing and configured such that batteries designed for use as a power supply of a power tool are respectively mountable thereon;
   a heat-generating means for boiling water by using electric power supplied by at least one of the batteries mounted on at least one of the battery-mount parts; and
   a lid provided on an upper surface of the housing that adjoins the planar side surface and is at least substantially perpendicular to the planar side surface;
      wherein the lid is configured to close and open an opening of the water reservoir such that the lid stands up like a wall along an upper end edge of the planar side surface of the housing when the opening of the water reservoir is opened; and
      the plurality of battery-mount parts is disposed below the lid on the planar side surface of the housing.

16. The electrical device according to claim 15, further comprising the batteries.

17. The electrical device according to claim 15, wherein:
   the lid is coupled by a hinge to the housing such that the lid is pivotable about the upper end edge of the planar side surface of the housing; and
   when the opening of the water reservoir is closed, an upper surface of the lid is flush with the upper surface of the housing.

18. An electrical device comprising:
   a housing;
   a first battery-mount part externally disposed on the housing and configured such that a first battery designed for use as a power supply of a power tool is mountable thereon;
   a second battery-mount part externally disposed on the housing and configured such that a second battery designed for use as a power supply of the power tool is mountable thereon;
   a heat-generating means for boiling water by using electric power supplied by the first battery mounted on the first battery-mount part or the second battery mounted on the second battery-mount part, the heat-generating means being disposed within the housing;
   a first power-supply line electrically connecting first power-supply terminals of the first battery-mount part and the heat-generating means;
   a second power-supply line electrically connecting second power-supply terminals of the second battery-mount part and the heat-generating means;
   a cover member movably coupled to the first battery-mount part and the second battery-mount part and configured to cover one of the first battery-mount part and the second battery-mount part while exposing the other of the first battery-mount part and second battery-mount part; and
   a cover-operation switch configured to detect movement of the cover member,
   wherein the cover-operation switch is configured such that removal of the cover member from the first battery-mount part and the second battery-mount part causes the first and second power-supply lines to be disconnected from the heat-generating means.

19. The electrical device according to claim 18, wherein:
   the cover-operation switch is configured to be operated in conjunction with the movement of the cover member; and
   the cover-operation switch is configured to disconnect the power-supply line between the power-supply terminals of the one of the first or second battery-mount parts that is currently covered by the cover member and the heat-generating means, and to connect the power-supply line between the power-supply terminals of the other of the first or second battery-mount parts that is currently exposed and the heat-generating means.

20. The electrical device according to claim 18, further comprising:
   a drip case mountable in the housing and configured to hold a pod, which contains a predetermined amount of tea leaves or coffee grounds held in a water-permeable bag-shaped element; and
   a hot water supply configured to automatically supply water boiled by the heat-generating means to an interior portion of the drip case so that the boiled water is poured or otherwise dispersed onto the pod,
   wherein the drip case further includes an extraction part configured to allow a hot beverage produced by the water that has been poured onto the pod to flow downwardly out of the drip case.

\* \* \* \* \*